US011243557B2

(12) United States Patent
Liang

(10) Patent No.: US 11,243,557 B2
(45) Date of Patent: Feb. 8, 2022

(54) REMOTE CONTROL

(71) Applicant: AUTEL ROBOTICS CO., LTD., Guangdong (CN)

(72) Inventor: Zhiying Liang, Guangdong (CN)

(73) Assignee: AUTEL ROBOTICS CO., LTD., Shenzhen (CN)

(*) Notice: Subject to any disclaimer, the term of this patent is extended or adjusted under 35 U.S.C. 154(b) by 0 days.

(21) Appl. No.: 16/805,132

(22) Filed: Feb. 28, 2020

(65) Prior Publication Data
US 2020/0333823 A1    Oct. 22, 2020

Related U.S. Application Data

(63) Continuation of application No. PCT/CN2018/084082, filed on Apr. 23, 2018.

(30) Foreign Application Priority Data

Sep. 1, 2017  (CN) .......................... 201710780632.8

(51) Int. Cl.
*G05G 9/02* (2006.01)
*G05G 5/04* (2006.01)
(Continued)

(52) U.S. Cl.
CPC .......... *G05G 9/04785* (2013.01); *A63F 13/24* (2014.09); *G05D 1/0016* (2013.01);
(Continued)

(58) Field of Classification Search
CPC .. G05G 1/04; G05G 1/10; G05G 1/12; G05G 5/04; G05G 5/05; G05G 9/04785;
(Continued)

(56) References Cited

U.S. PATENT DOCUMENTS 3,308,675 A * 3/1967 Olov ....................... F41G 7/301
                                                    74/471 R
9,864,397 B2 * 1/2018 Okamura ............... H01H 25/04
(Continued)

FOREIGN PATENT DOCUMENTS

CN     101607134 A    12/2009
CN     205412243 U     8/2016
(Continued)

OTHER PUBLICATIONS

Machine translation of CN 205412243 U obtained on Mar. 17, 2021.*
(Continued)

*Primary Examiner* — Adam D Rogers

(57) ABSTRACT

In an embodiment of the present invention, provides a remote control including: a remote control body and a control lever assembly at least partially accommodated in the remote control body; the control lever assembly including: a housing disposed in the remote control body; a rotating member disposed in the housing and rotatably connected to the housing; and a control lever connected to the rotating member, the control lever driving the rotating member to rotate around at least one direction relative to the housing; and the control lever having a handle and a dust-proof portion connected to the handle, the rotating member being connected to the dust-proof portion, the dust-proof portion being partially accommodated in the housing, and the rotating member being shielded by the dust-proof portion.

26 Claims, 27 Drawing Sheets

(51) Int. Cl.
*A63F 13/20* (2014.01)
*G05G 9/047* (2006.01)
*G05D 1/00* (2006.01)
*G05G 5/05* (2006.01)
*A63F 13/24* (2014.01)
*G05G 25/04* (2006.01)

(52) U.S. Cl.
CPC ............... *G05G 5/04* (2013.01); *G05G 5/05* (2013.01); *G05G 25/04* (2013.01); *G05G 2009/04718* (2013.01); *G05G 2009/04766* (2013.01); *G05G 2505/00* (2013.01)

(58) Field of Classification Search
CPC ..... G05G 9/04792; G05G 2009/04718; G05G 2009/04766; G05G 25/04; G05G 2505/00; G05D 1/0016; A63F 13/24
See application file for complete search history.

(56) References Cited

U.S. PATENT DOCUMENTS

| | | | | |
|---|---|---|---|---|
| 10,130,876 | B2* | 11/2018 | Huang | G05G 9/047 |
| 10,347,445 | B2* | 7/2019 | Wu | H01H 25/04 |
| 10,561,935 | B2* | 2/2020 | Tiffany | A63F 13/24 |
| 10,912,993 | B2* | 2/2021 | Guerrero, Jr. | A63F 13/22 |
| 2006/0290669 | A1* | 12/2006 | Ishimaru | G05G 9/047 |
| | | | | 345/161 |
| 2012/0274563 | A1* | 11/2012 | Olsson | G05G 9/047 |
| | | | | 345/161 |
| 2016/0361636 | A1* | 12/2016 | Gassoway | A63F 13/98 |
| 2017/0001106 | A1 | 1/2017 | Gassoway et al. | |

FOREIGN PATENT DOCUMENTS

| | | | | |
|---|---|---|---|---|
| CN | 106373360 | A | 2/2017 | |
| CN | 206411626 | U | 8/2017 | |
| CN | 104046699 | A | 10/2017 | |
| CN | 207149060 | U | 3/2018 | |
| CN | 107885351 | A | 4/2018 | |
| DE | 2704596 | A1 | 8/1978 | |
| DE | 3524439 | A1* | 1/1987 | H01H 3/20 |
| DE | 29505488 | U1 | 5/1995 | |

OTHER PUBLICATIONS

Anonymous: "Jake's Electronics; Project—Cheerson CX-10 Mode Modification", May 20, 2017; XP055733282; Retrieved from the Internet: URL:https://web.archive.org/web/20170520132125/http://www.jakeselectronics.net:80/projects_cheersoncx-10.php figures 3, 12 . . . please view url page.

RCMode 1 Reviews: "Teardown: Cheerson CX-10 micro quadcopter", Jan. 7, 2015, XP054980910, Youtube Retrieved from the Internet: URL:https://www.youtube.com/watch?v=hYUANzAzkuY; Please view YouTube at link provided . . . Time position 2:01-2:06, Time position 2:27.

Extended European Search Report dated Oct. 14, 2020, Appln. No. 18852567.9.

International Search Report dated Jul. 26, 2018; PCT/CN2018/084082.

* cited by examiner

REMOTE CONTROL

This application is a continuation application of International Application No. PCT/CN2018/084082, filed on Apr. 23, 2018, which claims priority of Chinese Patent Application No. 201710780632.8, filed on Sep. 1, 2017, which is incorporated herein by reference in its entirety.

BACKGROUND

Technical Field

The present invention relates to the field of an unmanned aerial vehicle, and in particular, to a remote control.

Related Art

In the prior art, an unmanned aerial vehicle is controlled by a remote control. A control device (for example, a control lever assembly) is disposed on a remote control of an unmanned aerial vehicle. A user may send a control instruction to the unmanned aerial vehicle through the control device to control a flight status of the unmanned aerial vehicle. The remote control includes two control levers that control four parameters in total, namely pitch, yaw, a roll and an acceleration. For example, one control lever controls the accelerator and the yaw, and the other control lever controls the pitch and the roll.

Because a control lever of the remote control in the prior art is usually a split-type rotating structure composed of a plurality of components, external sand, dust or moisture may easily enter an interior of the remote control through a gap on the control lever, and an appearance of the split-type rotating structure and intuitive feeling of rotation thereof to a user are not ideal, providing a bad user experience.

SUMMARY

In order to resolve the foregoing technical problems, embodiments of the present invention provide a remote control, so that on one hand, some external sand or moisture may be prevented from entering, on the other hand, an appearance of a control lever assembly of the remote control may be better optimized, and a user that performs an operation may intuitively feel that a control lever rotates around a rotation center, providing better user experience.

In order to resolve the foregoing problem, an embodiment of the present invention provides a technical solution below:

a remote control, including: a remote-control body; and a control lever assembly at least partially accommodated in the remote-control body; the control lever assembly including:

a housing disposed in the remote-control body;

a rotating member disposed in the housing and rotatably connected to the housing; and a control lever connected to the rotating member, the control lever driving the rotating member to rotate around at least one direction relative to the housing; and the control lever having a handle and a dust-proof portion connected to the handle, the rotating member being connected to the dust-proof portion, the dust-proof portion being partially accommodated in the housing, and the rotating member being shielded by the dust-proof portion.

In some embodiments, the dust-proof portion has a hollow semi-spherical shape.

In some embodiments, the handle and the dust-proof portion are integrally formed.

In some embodiments, the rotating member includes: a first rotating member, the first rotating member being rotatably connected to the housing to cause the control lever to drive the first rotating member for rotating around a first direction relative to the housing; and a second rotating member, the second rotating member being connected to the dust-proof portion and being rotatably connected to the first rotating member, to cause the control lever to drive the second rotating member for rotating around a second direction relative to the housing.

In some embodiments, the first rotating member includes a rotating member body, a rotating housing disposed at both ends of the rotating member body and a first rotating shaft disposed on the rotating housing along the first direction and a second rotating shaft disposed along the second direction, respectively;

the second rotating member includes a base and an extending portion disposed on both sides of the base, mounting holes being disposed on two ends of the base, respectively, and the extending portion being connected to the dust-proof portion; and the first rotating member is rotatably connected to the housing through the first rotating shaft, two ends of the second rotating shaft being accommodated in the mounting holes respectively to cause the first rotating member to be rotatably connected to the second rotating member.

In some embodiments, the first direction is perpendicular to the second direction.

In some embodiments, the control lever assembly further includes a first elastic component; the first elastic component being sleeved on the first rotating shaft, and the first elastic component abutting between the housing and the first rotating member.

In some embodiments, the first elastic component includes a first sleeving portion sleeved on the first rotating shaft and a first abutting portion extending from the first sleeving portion; and the first rotating member further includes first limiting posts respectively disposed on both sides of the first rotating shaft, and first limiting faces that are relatively spaced apart is disposed on the housing; a distance between the first limiting posts being smaller than a distance between the first limiting faces; and the first abutting portion being sandwiched between the first limiting posts and abutting against the first limiting post and the first limiting face.

In some embodiments, the first elastic component is a torsion spring, the first abutting portion being a spring leg of the torsion spring.

In some embodiments, the control lever assembly further includes a second elastic component; the second elastic component being sleeved on the second rotating shaft, and the second elastic component abutting between the second rotating member and the first rotating member.

In some embodiments, the second elastic component includes a second sleeving portion sleeved on the second rotating shaft and a second abutting portion extending from the second sleeving portion; and the first rotating member further includes second limiting posts disposed on both sides of the second rotating shaft respectively, and second limiting faces that are relatively spaced apart are disposed on the second rotating member; a distance between the second limiting posts being smaller than a distance between the second limiting faces; and the second abutting portion is sandwiched between the second limiting posts and abuts against the second limiting post and the second limiting face.

In some embodiments, the second elastic component is a torsion spring, the second abutting portion being a spring leg of the torsion spring.

In some embodiments, the control lever assembly further includes: a first limiting structure for limiting rotation of the first rotating member around the first direction; and a second limiting structure for limiting rotation of the second rotating member around the second direction.

In some embodiments, the second limiting structure includes a limiting portion disposed on a rotating member body of the first rotating member. When the control lever drives the second rotating member to rotate to an extreme position, the base of the second rotating member abuts against the limiting portion.

In some embodiments, the limiting portion is an inclined face disposed on the rotating member body, the inclined face being symmetrically disposed on both sides of the second rotating shaft.

In some embodiments, the first limiting structure is a limiting block disposed on the housing, when the control lever drives the first rotating member to rotate to an extreme position, a rotating housing of the first rotating member abutting against the limiting block.

In some embodiments, the housing includes an upper housing and a lower housing, the upper housing and the lower housing being engaged with each other to form an accommodating portion for accommodating the rotating member;

the upper housing including a bottom wall and a side wall that is bent and extended from an outer edge of the bottom wall, and the limiting block being disposed on a surface that is of the bottom wall and that faces the accommodating portion.

In some embodiments, a limiting hole for exposing the control lever is further opened on the bottom wall, and the limiting block is disposed along a circumferential direction of the limiting hole.

In some embodiments, there are four limiting blocks, the four limiting blocks being symmetrically disposed relative to a straight line passing through a center of the limiting hole.

In some embodiments, the limiting block is triangular.

In some embodiments, a range of an angle at which the control lever rotates around the first direction is 45-60 degrees.

In some embodiments, a range of an angle at which the control lever rotates around the second direction is 45-60 degrees.

In some embodiments, the housing is fixedly connected to the remote-control body.

In some embodiments, the housing and the remote-control body are integrally formed.

In order to resolve the foregoing problem, the present invention further provides a technical solution below:

a remote control, including:
a remote-control body; and
a control lever assembly at least partially accommodated in the remote-control body; the control lever assembly including:
a housing disposed in the remote-control body;
a rotating member disposed in the housing and rotatably connected to the housing; and
a control lever connected to the rotating member, the control lever driving the rotating member to rotate around at least one direction relative to the housing; and
a dust-proof cover sleeved on the control lever and connected to the housing.

In some embodiments, the dust-proof cover includes a fixing portion sleeved on the control lever, an elastic bending portion connected to the fixing portion and a connecting portion connected to the elastic bending portion, the connecting portion being connected to the housing.

In some embodiments, the fixing portion, the elastic bending portion and the connecting portion may be integrally formed.

In some embodiments, the control lever assembly further includes a cover plate, the cover plate being provided with an accommodating hole for accommodating the control lever, the cover plate being connected to the housing, and the connecting portion being sandwiched between the cover plate and the housing.

In some embodiments, the control lever has a handle and a dust-proof portion connected to the handle, the rotating member being connected to the dust-proof portion, the dust-proof portion being partially accommodated in the housing, and the rotating member being shielded by the dust-proof portion.

In some embodiments, the dust-proof portion has a hollow semi-spherical shape.

In some embodiments, the handle and the dust-proof portion are integrally formed.

In some embodiments, the rotating member is the rotating member as described above.

Compared to the prior art, through the control lever assembly of the remote control provided according to the embodiments of the present invention, some external sand or moisture may be prevented from entering, an appearance of the control lever assembly may be better optimized, and the user who performs an operation may intuitively feel that the control lever rotates around a rotating center, providing better user experience.

BRIEF DESCRIPTION OF THE DRAWINGS

One or more embodiments are described by way of example with reference to the corresponding accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

FIG. 10-1 to FIG. 10-3 are sectional diagrams of the control lever and the first rotating member at different positions during rotation around a first direction in the control lever assembly shown in FIG. 2;

FIG. 12-1 to FIG. 12-3 are sectional diagrams of the control lever and the second rotating member at different positions during rotation around a second direction in the control lever assembly shown in FIG. 2;

FIG. 13-1 to FIG. 13-2 show force bearing situations of a control lever and a first rotating member during rotation around a first direction (a z-axis direction) in the control lever assembly shown in FIG. 2;

FIG. 14-1 to FIG. 14-2 show force bearing situations of a control lever and a second rotating member during rotation around a second direction (an X-axis direction) in the control lever assembly shown in FIG. 2;

FIG. 15-1 to FIG. 15-3 are three-dimensional structural diagrams of the control lever assembly shown in FIG. 2 when a control lever is moved to different positions;

DETAILED DESCRIPTION

For ease of understanding the present invention, the present invention is described in further detail below with reference to the accompanying drawings and specific embodiments. It should be noted that an element described as being "fixed" to another element may be directly on the other element, or one or more intervening components may be present. An element described as being "connected" to another element may be directly connected to the other element, or one or more intervening components may be present. The orientations or positional relationships indicated by the terms "upper", "lower", "inside", "outside", "bottom", and the like used in this specification are based on the orientations or positional relationships shown in the accompanying drawings, are only used for ease of describing the present invention and simplifying the description instead of indicating or implying that a specified apparatus or element has a particular orientation or is constructed and operated in a particular orientation, and should not be construed as a limitation on the present invention. In addition, the terms "first", "second", "third", and the like are only used for description and should not be construed as indicating or implying relative importance.

Unless otherwise defined, all technical and scientific terms used herein have the same meaning as commonly understood by one of ordinary skill in the art to which the present invention belongs. In this specification, terms used in the specification of the present invention are merely intended to describe objectives of the specific embodiments, but are not intended to limit the present invention. As used herein, the term "and/or" includes any and all combinations of one or more related items listed.

In addition, the technical features provided in different embodiments of the present invention to be described below may be combined with each other as long as no conflict occurs.

Figure 1:
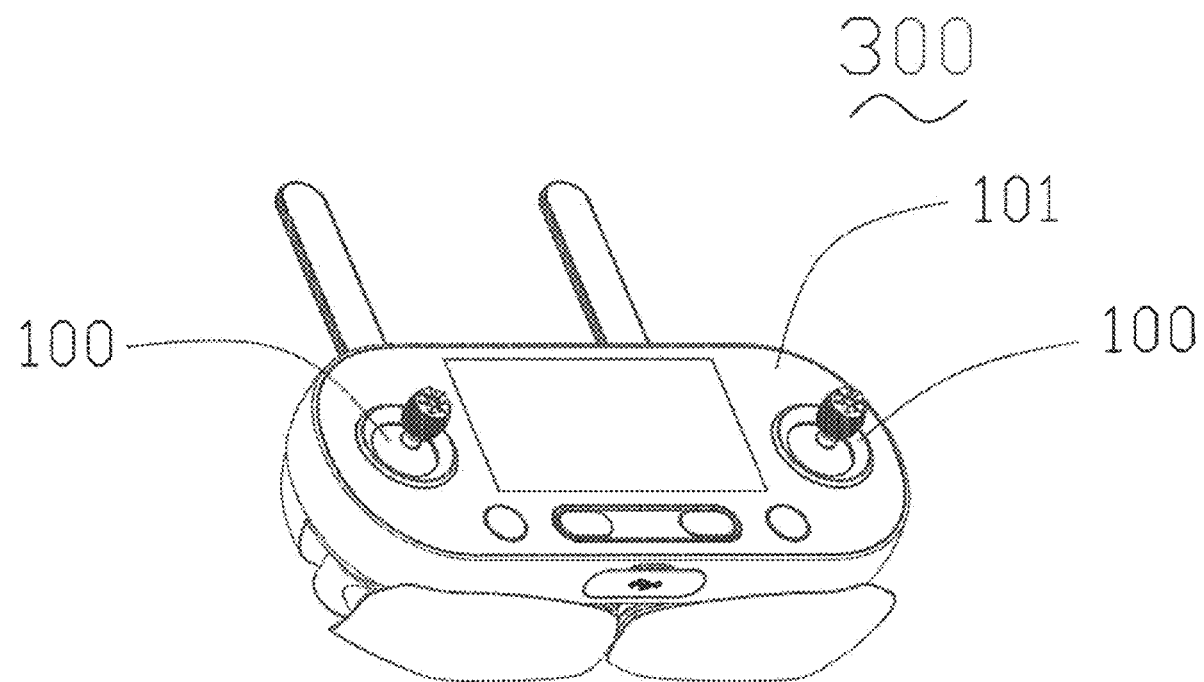
FIG. 1 is a three-dimensional structural diagram of a remote control according to an embodiment of the present invention.

Referring to FIG. 1, a remote control 300 is shown according to an embodiment of the present invention, the remote control being used to remotely control a movable object. The movable object may be an unmanned aerial vehicle (UAV), an aircraft model and an electric toy, etc. The remote control 300 includes a remote-control body 101 and a control lever assembly 100. The control lever assembly 100 is mounted to the remote-control body 101 and is at least partially accommodated in the remote-control body 101 as shown.

In this embodiment, the remote control 300 includes two control lever assemblies 100 in total. One of the control lever assemblies 100 may be used to trigger the remote control 300 to generate a corresponding remote control instruction for controlling the movable object to parallelly move in a plane in which the movable object is located, such as moving forward, backward, leftward, rightward, or forward and leftward, forward and rightward, backward and leftward and backward and rightward, etc. The other control lever assembly 100 may be used to trigger the remote control 300 to generate a corresponding remote control instruction for controlling the movable object to move in a vertical direction and/or rotate in a horizontal plane, for example, causing the movable object as shown to move upward, move downward in the vertical direction, and/or rotate clockwise and counterclockwise in the horizontal plane.

FIG. 2 to FIG. 6 further show the control lever assembly 100 and an internal structure thereof in the remote control 300 shown in FIG. 1. First referring to FIG. 2 and FIG. 3, the control lever assembly 100 includes: a housing 30 connected to the remote control body 101 and located in the remote control body 101, a control lever 40 connected to the housing 30, a rotating member connected to the control lever 40 and a sensor assembly for implementing a remote control function of the remote control. Both the rotating member and a circuit board 80 are disposed in the housing 30. The rotating member is rotatably connected to the housing 30. The sensor assembly includes a circuit board 80 connected to the housing 30 and a magnet 90 connected to the rotating member. A magnetic induction chip for inducting a magnetic field change is disposed on the circuit board 80. Preferably, the magnetic induction chip may be a Hall chip. In another embodiment of the present invention, the magnetic induction chip may be replaced by a potentiometer.

Figure 2:
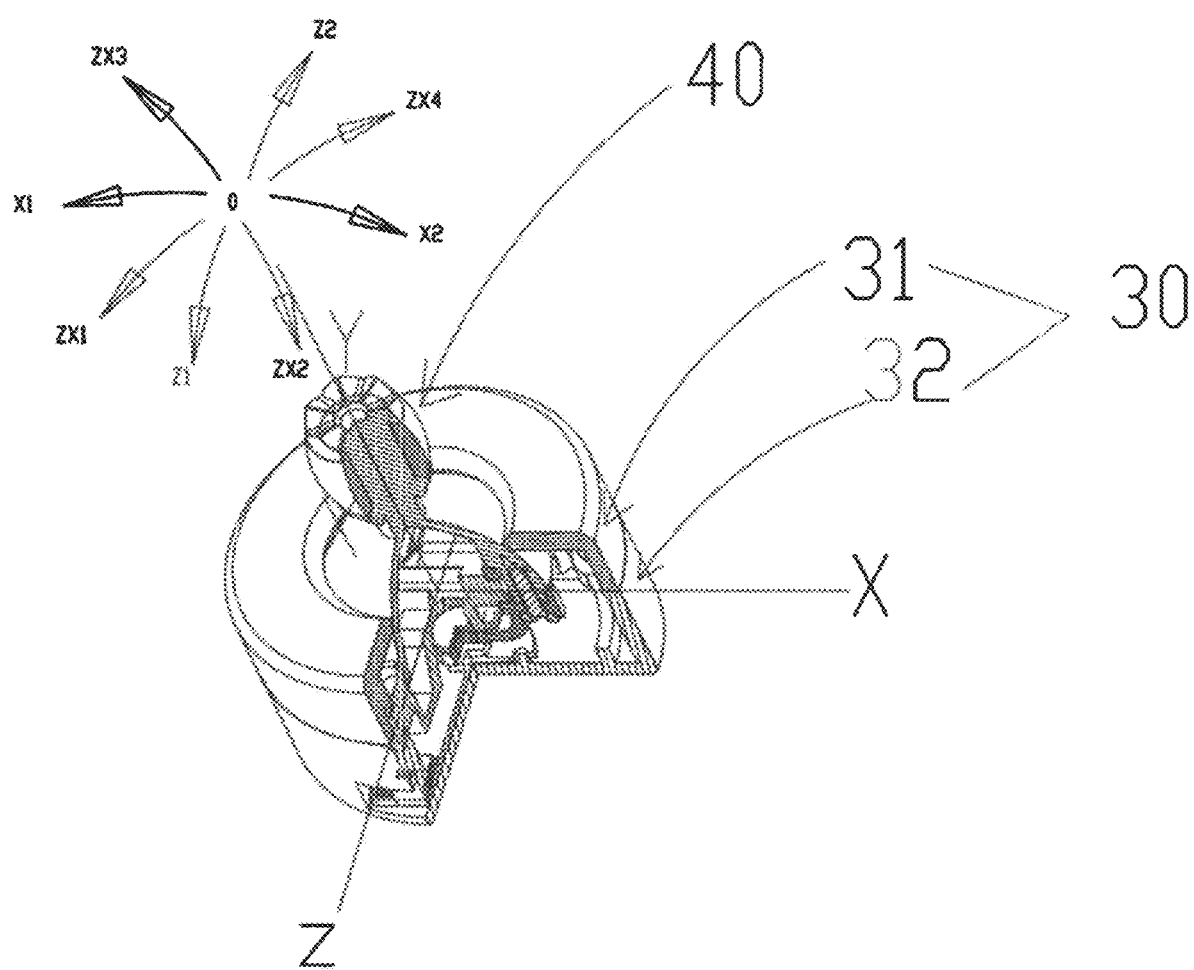
FIG. 2 is a partial sectional diagram of a control lever assembly in the remote control shown in FIG. 1.

As shown in FIG. 2, the rotating member is connected to the control lever 40, so that the control lever 40 may drive the rotating member to rotate around at least one direction relative to the housing 30. In particular, the control lever 40 may rotate around a first direction (i.e., a direction shown by a Z axis) relative to the housing 30, and the control lever 40 may further rotate around a second direction (i.e., a direction shown by an X direction) relative to the housing 30, the first direction (i.e., the Z axis) and the second direction (i.e., the direction shown by the X axis) are perpendicular to each other and intersect. For example, when the control lever 40 rotates relative to the direction shown by the Z axis, the control lever 40 may rotate toward the direction shown by X1 or X2 in FIG. 2. When the control lever 40 rotates relative to the direction shown by the X axis, the control lever 40 may rotate toward the direction shown by Z1 or Z2 in FIG. 2. When the control lever 40 simultaneously rotates around the direction shown by the Z axis and the direction shown by the X axis, the control lever 40 may rotate around any direction relative to the housing 30. For example, the control lever 40 may be rotated toward directions shown by ZX1, ZX2, ZX3 or ZX4 in FIG. 2.

The housing 30 includes an upper housing 31 and a lower housing 32 engaged with the upper housing 31. The upper housing 31 is engaged with the lower housing 32 to form an accommodating portion for accommodating the rotating member and the circuit board 80. In this embodiment, the lower housing 32 is detachably connected to the upper housing 31. In an embodiment of the present invention, the upper housing 31 may be detachably connected to the lower housing 32 by bolts. It may be understood that, in some other embodiments, the lower housing 32 may be further connected to the upper housing 31 by snaps, or both the lower housing 32 and the upper housing 31 are provided with corresponding threads to be directly connected to each other through threads. In other possible embodiments, the upper housing 31 and the lower housing 32 may also be integrally formed. It is worth mentioning that, in other possible embodiments, the housing 30 and the remote control body 101 may further be integrally formed, that is, the housing 30 is a part of the remote control body 101, or a part of the remote control body 101 may be adopted as the housing of the control lever assembly 100.

Figure 7:
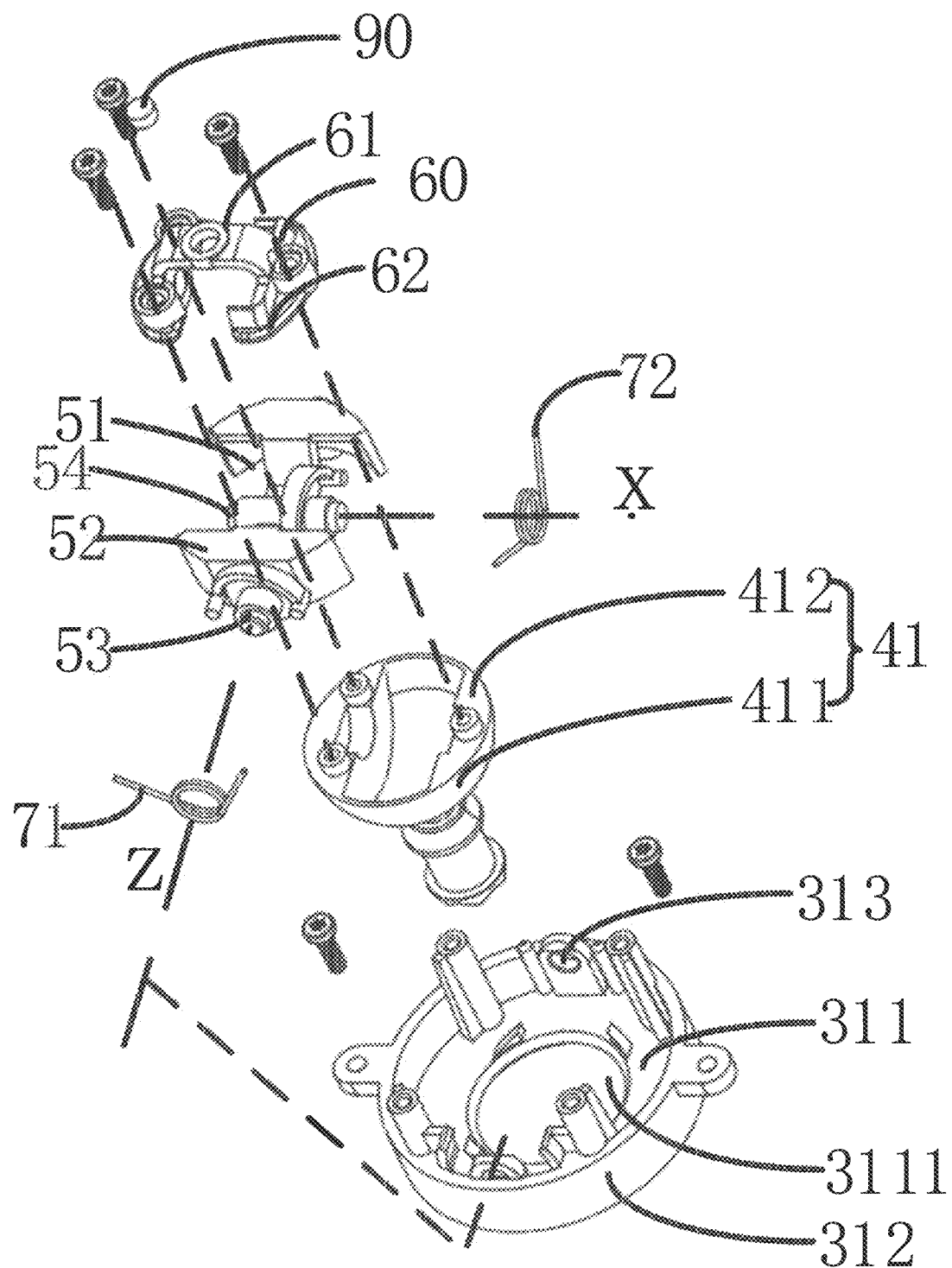
FIG. 7 is a structural exploded diagram of an upper housing, a control lever and a rotating member in the control lever assembly shown in FIG. 2, the rotating member including a first rotating member and a second rotating member.

As shown in FIG. 7, the upper housing 31 includes a bottom wall 311 and a side wall 312 bent and extended from an outer edge of the bottom wall 311. A limiting hole 3111 for exposing the control lever 40 as shown is disposed at a middle of the bottom wall 311, the control lever 40 passing through the limiting hole 3111. The control lever 40 may swing within a range defined by the limiting hole 3111. The lower housing 32 has a bottom wall, and the circuit board 80 of the sensor assembly is fixed to the bottom wall of the lower housing 32.

Figure 4:
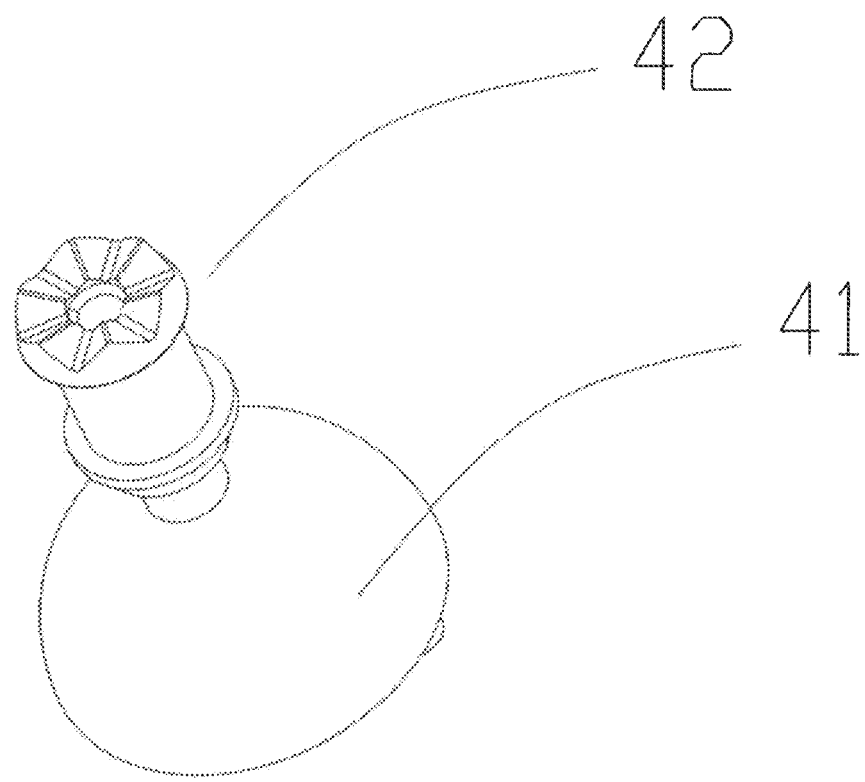
FIG. 4 is a three-dimensional structural diagram of the control lever in the control lever assembly shown in FIG. 2.
Figure 5:
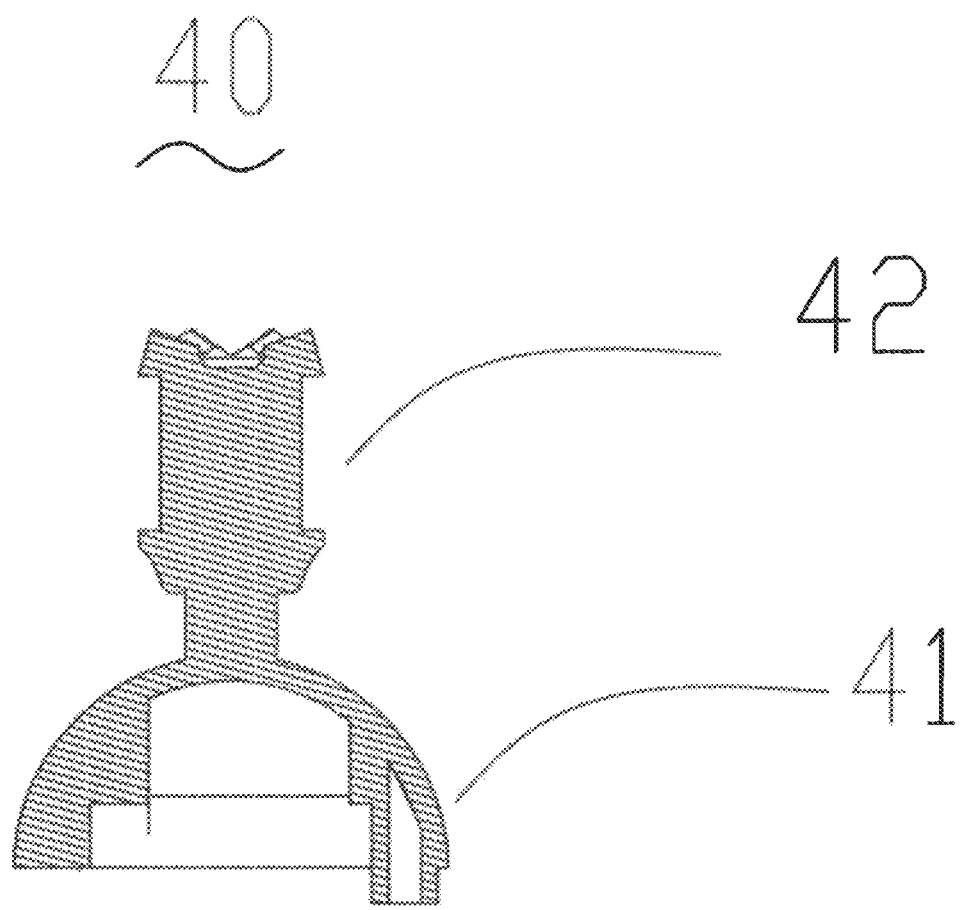
FIG. 5 is a sectional diagram of the control lever shown in FIG. 5.
Figure 6:
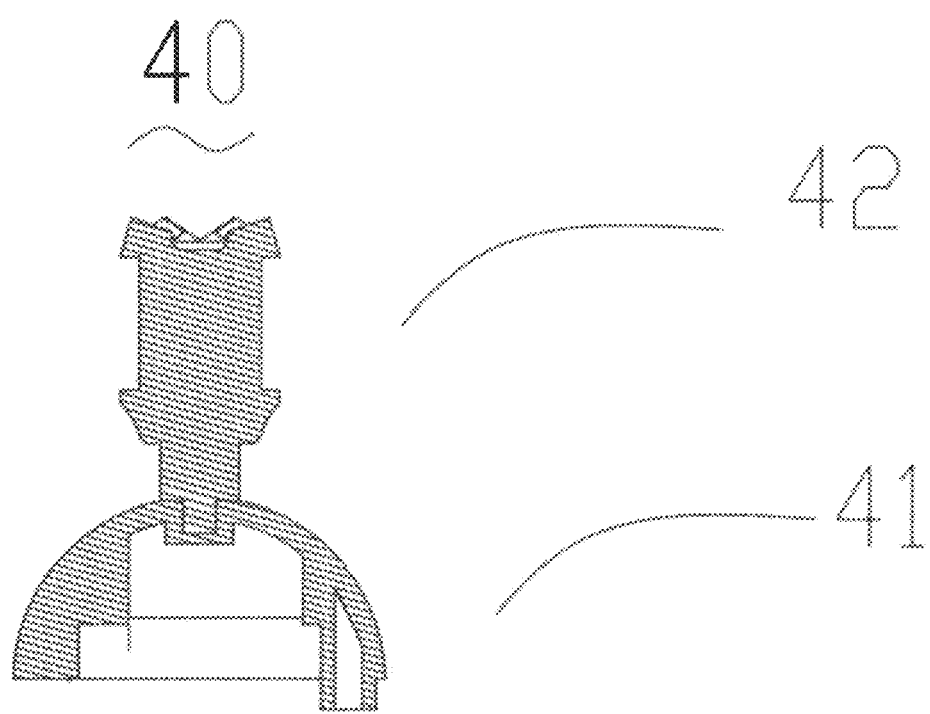
FIG. 6 is a sectional diagram of a control lever according to another embodiment of the present invention.

Referring to FIG. 4 and FIG. 5, a three-dimensional diagram and a sectional diagram of a control lever 40 of an embodiment of the present invention are shown respectively. The control lever 40 has a handle 42 and a dust-proof portion 41 connected to the handle 42. The rotating member is connected to the dust-proof portion 41. The dust-proof portion 41 is partially accommodated in the housing 30, and the rotating member is shielded by the dust-proof part 41. Therefore, the control lever assembly 100 of the present invention may prevent external sand, dust or moisture from entering the remote control. In an embodiment of the present invention, the dust-proof portion 41 is hollow and semi-spherical, and the dust-proof portion 41 and the handle 42 are integrally formed. The integrally formed control lever 40 may further prevent external dust or moisture from entering the remote control to provide a better dust-proof effect. In other embodiments, as shown in FIG. 6, the dust-proof portion 41 and the handle 42 may also be two independent components and are fixedly connected together after being manufactured, respectively.

As shown in FIG. 7, in an embodiment of the present invention, the dust-proof portion 41 includes a circular arc face 411 and a mounting plane 412, the mounting plane 412 being used to be connected to the second rotating member 60.

Figure 3:
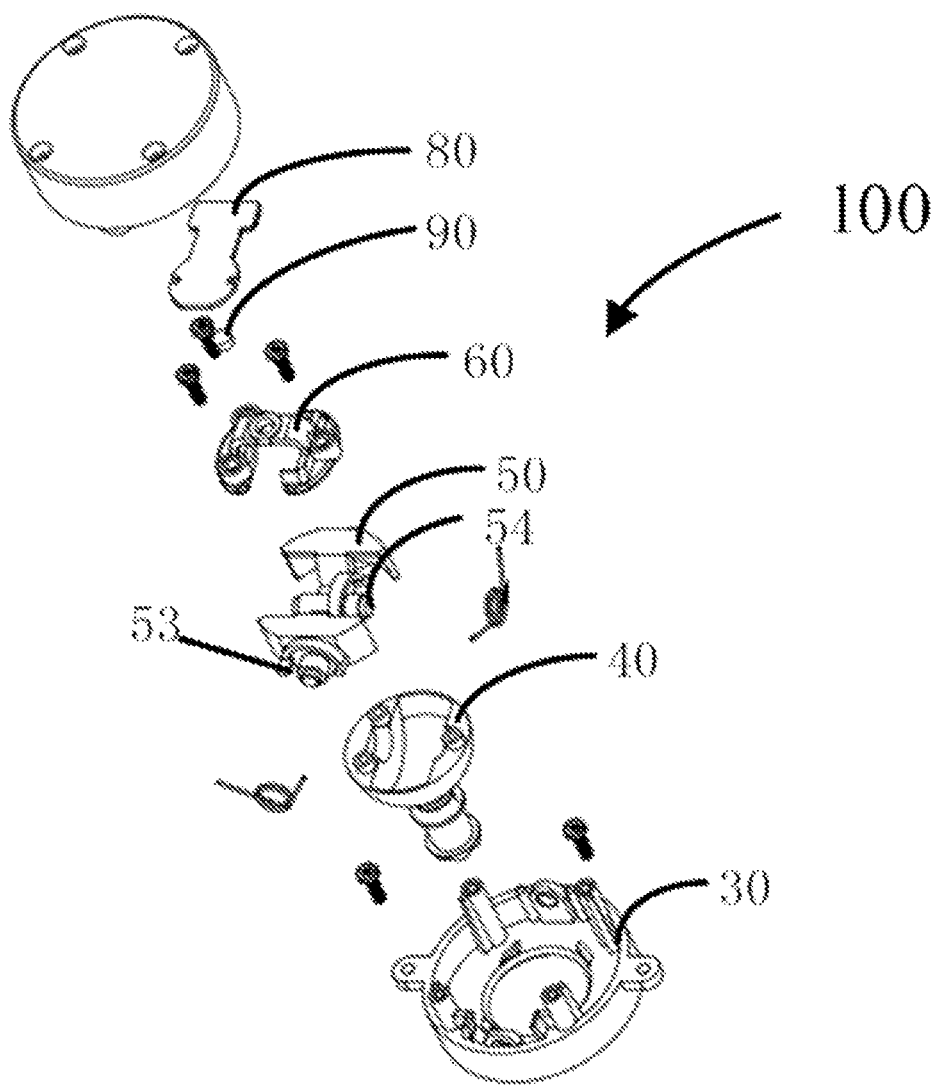
FIG. 3 is a structural exploded diagram of the control lever assembly shown in FIG. 2.
Figure 8:
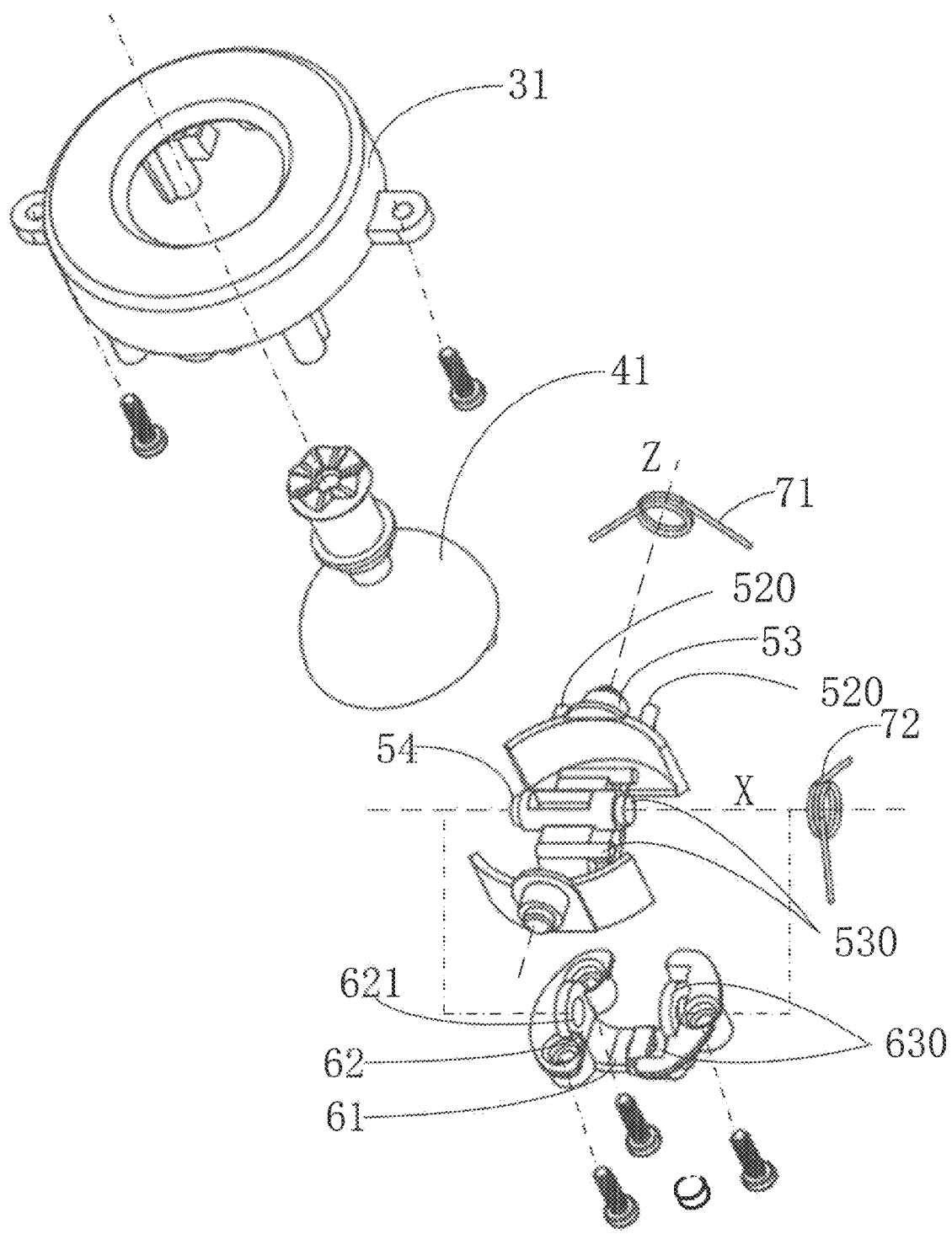
FIG. 8 is a structural exploded diagram of the upper housing, the control lever and the rotating member in the control lever assembly shown in FIG. 2 from another perspective.

As shown in FIG. 7 to FIG. 8 and referring to FIG. 3, the rotating member includes a first rotating member 50 rotatably connected to the housing 30 and a second rotating member 60 connected to the dust-proof portion 41 of the control lever 40.

The first rotating member 50 includes a rotating member body 51, a rotating housing 52 disposed at both ends of the rotating member body 51 and a first rotating shaft 53 disposed on the rotating housing 52 along a first direction, and a second rotating shaft 54 disposed along a second direction, respectively. In an embodiment of the present invention, the first direction and the second direction are perpendicular to each other, the first direction being a Z direction in FIG. 7, and the second direction being an X direction in FIG. 7. Therefore, the control lever 40 may be rotated around the X direction and the Z direction.

In this embodiment, a first connecting hole 313 is disposed in the upper housing 31.

The first connecting hole 313 may be directly disposed on a side wall 312 of the upper housing 31 or disposed on a connecting post (not marked) that is fixedly connected to the bottom wall 311. The first rotating shaft 53 is accommodated in the first connecting hole 313 to cause the rotating member to be rotatably connected to the housing 30.

It may be understood that, in some other embodiments, the first connecting hole may be disposed on the first rotating member 50, and the first rotating shaft may be disposed on the upper housing 31.

As shown in FIG. 8, the second rotating member 60 includes a base 61 and an extending portion 62 disposed on both sides of the base 61. Mounting holes 621 are respectively disposed at two ends of the base 61, and a magnet 90 in the sensor assembly is disposed at a middle position of the base 61. In an embodiment of the present invention, an accommodating hole for accommodating the magnet 90 is disposed at a middle position of the base 61.

Three threaded holes are opened in the extending portion 62. A stud corresponding to the threaded hole is disposed on a mounting plane 412 of the dust-proof portion 41. The second rotating member 60 is connected to the studs of the dust-proof portion 41 through the three threaded holes of the base 61 and screws matched with the three threaded holes.

Two ends of the second rotating shaft 53 are respectively accommodated in the mounting holes 621 to cause the first rotating member 50 to be rotatably connected to the second rotating member 60. The base 61 and the extending portion 62 are substantially semi-circular.

As shown in FIG. 8, in an embodiment of the present invention, a control lever assembly 100 further includes a first elastic component 71 sleeved on the first rotating shaft 53 and a second elastic component 72 sleeved on the second rotating shaft 54. The first elastic component 71 abuts between an upper housing 31 and a first rotating member 50, and the second elastic component 72 abuts between a second rotating member 60 and a first rotating member 50. In an embodiment, both the first elastic component 71 and the second elastic component 72 are torsional springs.

Figure 9:
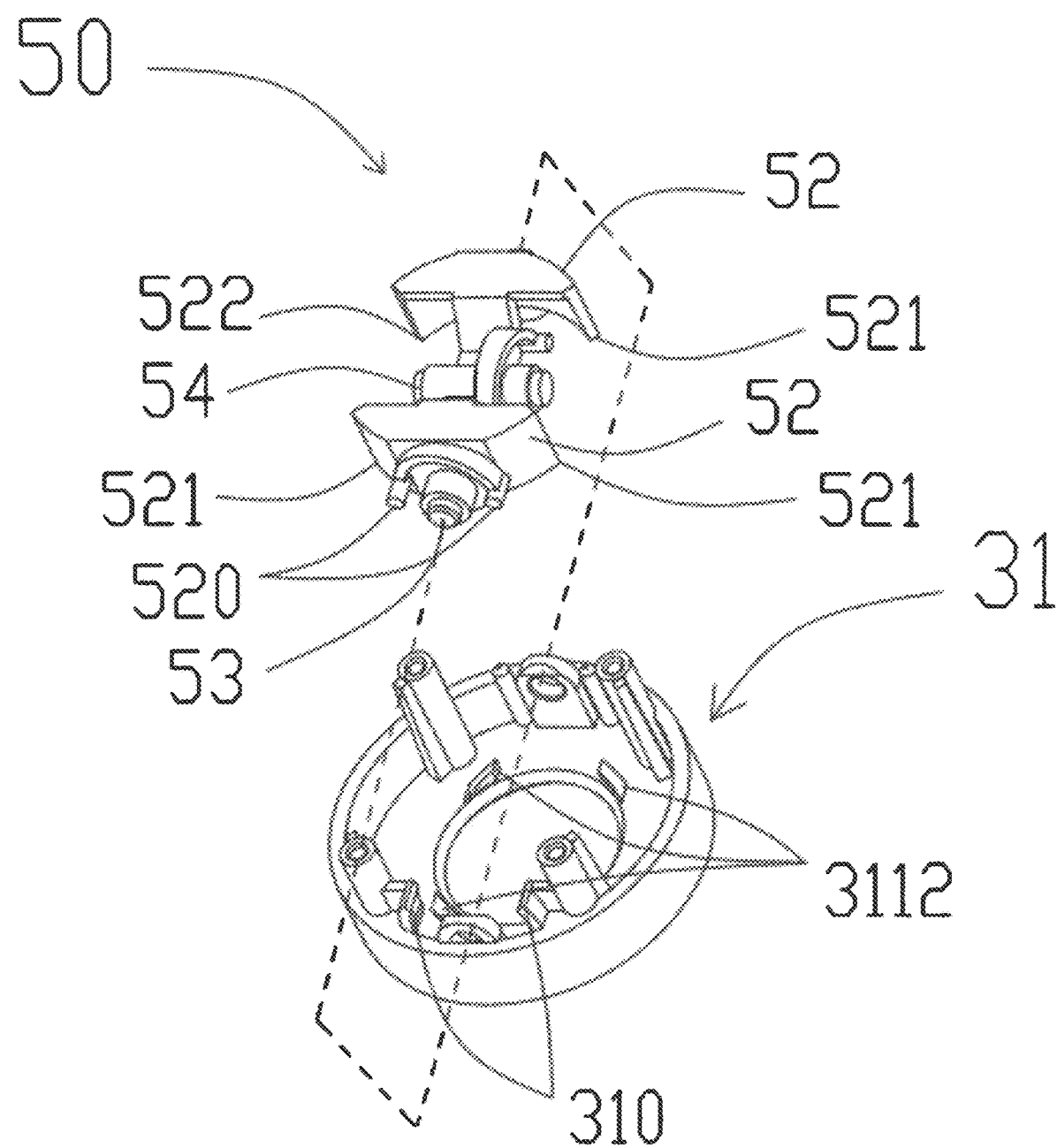
FIG. 9 is a structural exploded diagram of a first rotating member and an upper housing in the control lever assembly shown in FIG. 2.
Figures 1, 13:
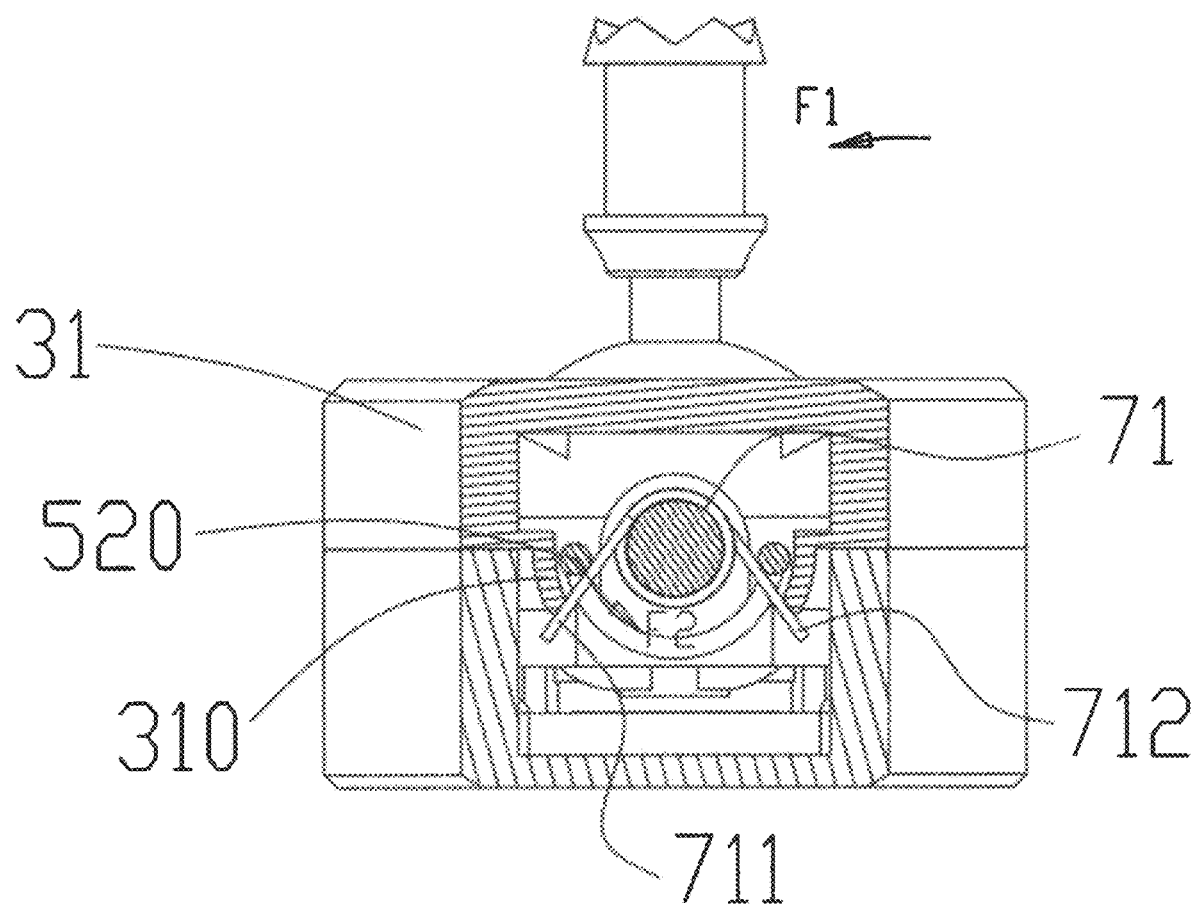
Figures 2, 13:
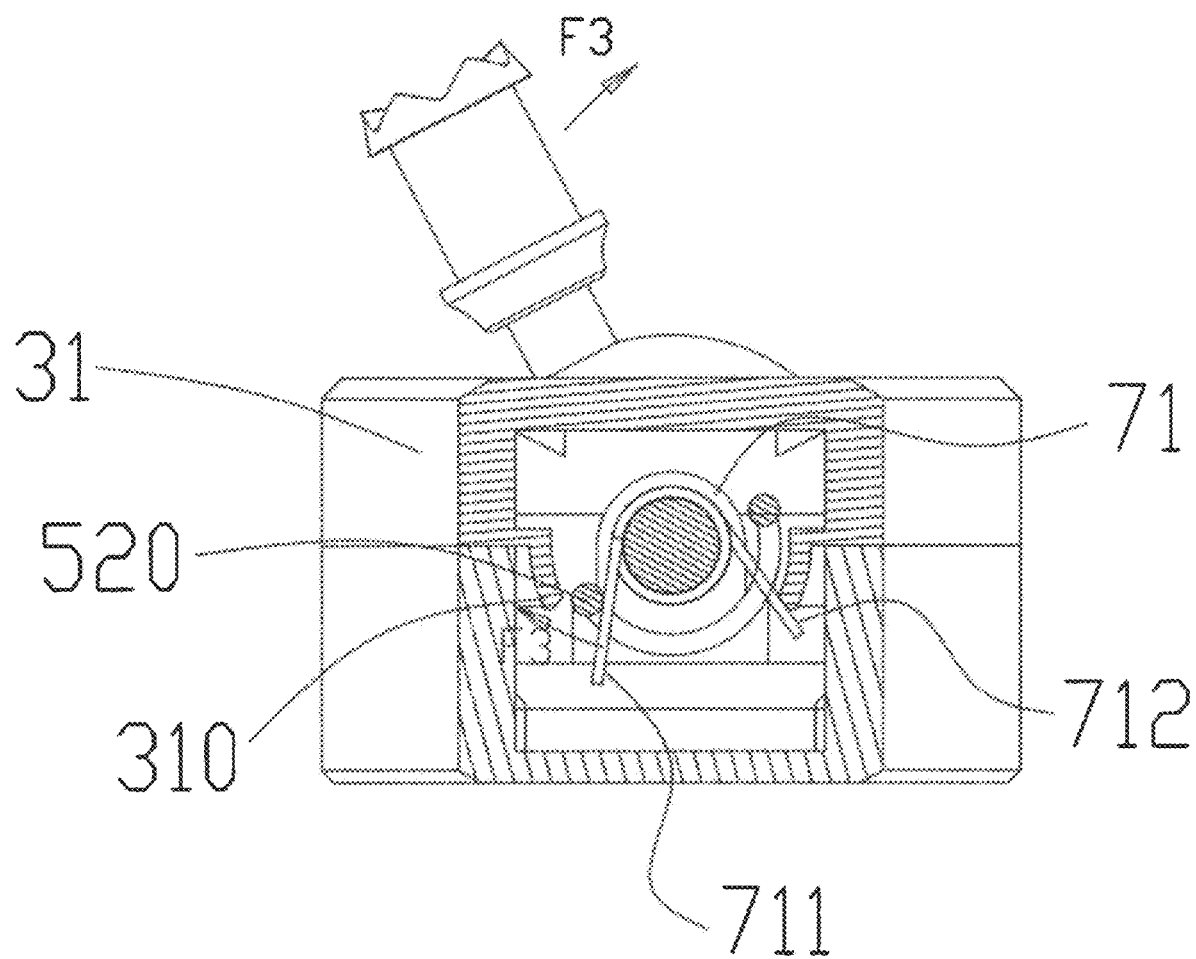

In particular, referring to FIG. 13-1 and FIG. 13-2, the first elastic component 71 includes a first sleeving portion 710 sleeved on the first rotating shaft 53 and two first abutting portions extending from the first sleeving portion 710. First limiting posts 520 are disposed on both sides of the first rotating shaft 53 of the first rotating member 50, respectively, and two first limiting faces 310 (as shown in FIG. 9) that are relatively spaced apart are disposed at corresponding positions on the upper housing 31. A distance between the two first limiting posts 520 is smaller than a distance between the two first limiting faces 310. The first abutting portion is sandwiched between the first limiting posts 520 and abuts against the first limiting post 520 and the first limiting face 310. In this embodiment, the two first abutting portions are spring legs 711 and 712 of the first elastic component 71. In particular, after the first elastic component 71 is sleeved on the first rotating shaft 53, two spring legs 711 and 712 thereof are sandwiched between the two first limiting posts 520 and the two first limiting faces 310, and abut against the two first limiting posts 520 and the two first limiting faces 310, respectively.

Figures 1, 14:
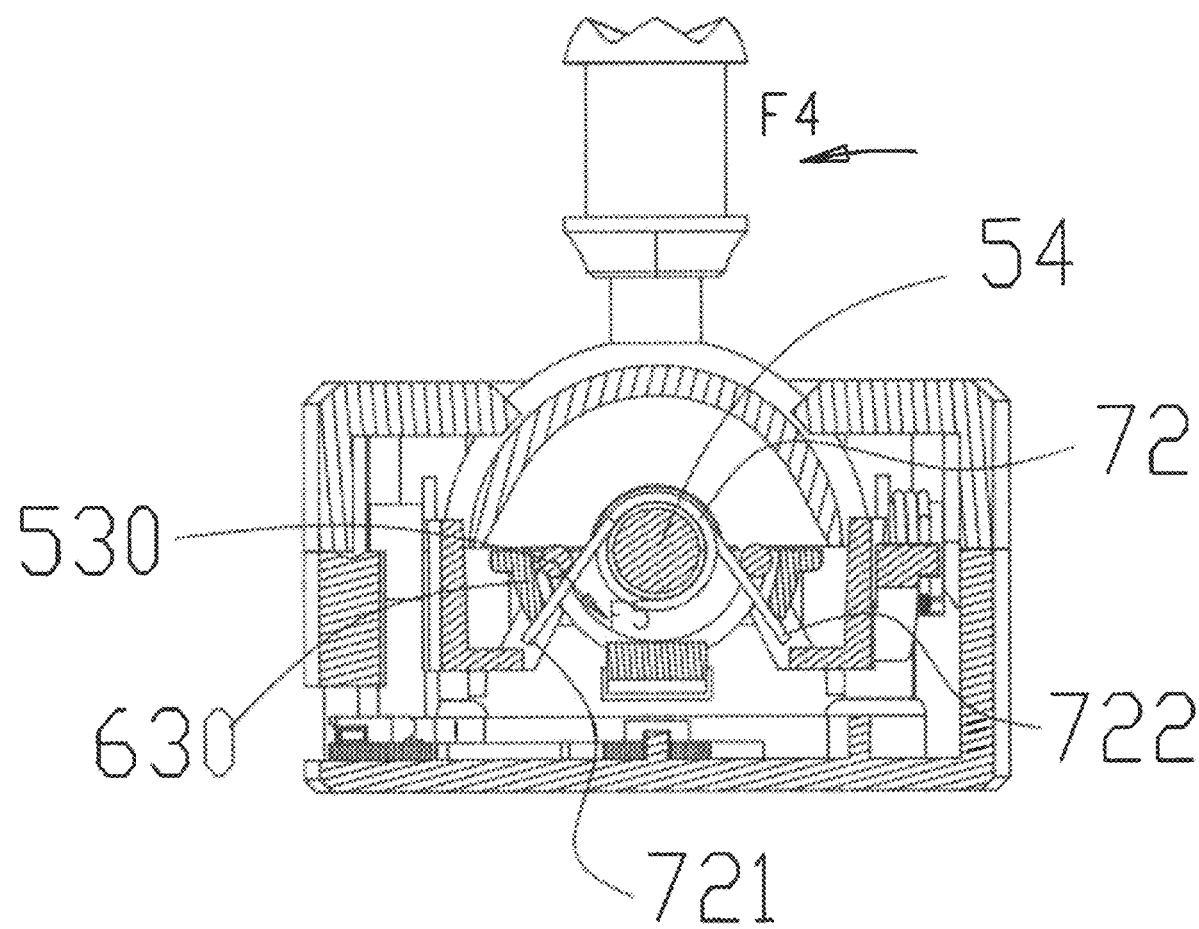
Figures 2, 14:
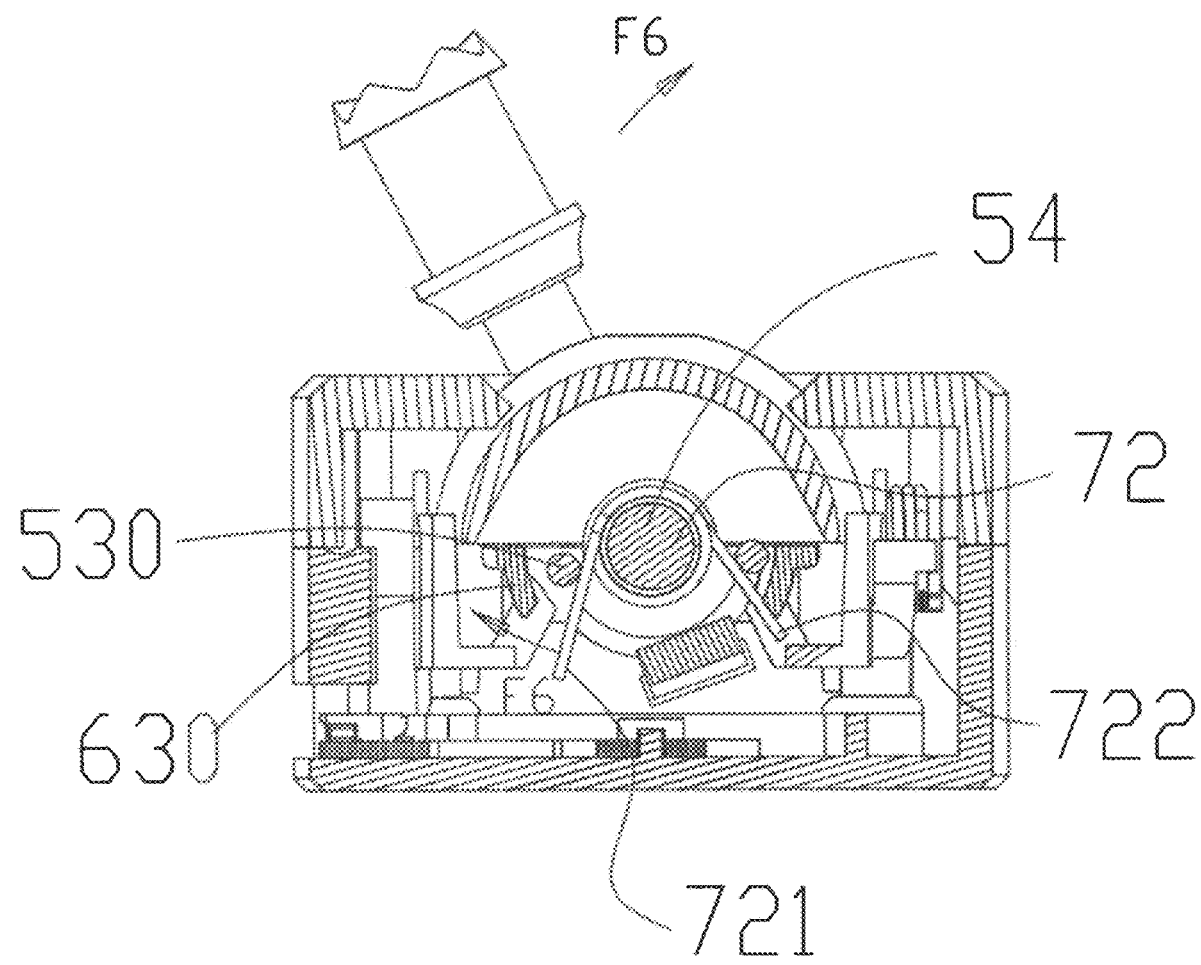

In particular, referring to FIG. 14-1 and FIG. 14-2, the second elastic component 72 includes a second sleeving portion 720 sleeved on the second rotating shaft 54 and two second abutting portions extending from the second sleeving portion 720. Second limiting posts 530 are disposed on both sides of the second rotating shaft 54 of the first rotating member 50 respectively, and two second limiting faces 630 that are relatively spaced apart are disposed at corresponding positions on the second rotating member 60. A distance between the two second limiting posts 530 is smaller than a distance between the two second limiting faces 630. The second abutting portion is sandwiched between the second limiting posts 530 and abuts against the second limiting post 530 and the second limiting face 630. In this embodiment, the two second abutting portions are spring legs 721 and 722 of the second elastic component 72. In particular, after the second elastic component 72 is sleeved on the second rotating shaft 54, two spring legs 721 and 722 thereof are sandwiched between the two second limiting posts 530 and the two second limiting faces 630, and abut against the two second limiting posts 530 and the two second limiting faces 630, respectively.

In an embodiment of the present invention, the first elastic component 71 and the second elastic component 72 may further be components that may provide elastic restoring force, such as an elastic piece.

In an embodiment of the present invention, the control lever assembly 100 further includes a first limiting structure and a second limiting structure. The first limiting structure is used to limit that the first rotating member 50 rotates around the first direction. The second limiting structure is used to limit that the second rotating member 60 rotates around the second direction.

The first limiting structure of the control lever assembly 100 is specifically described below with reference to FIG. 9 and FIG. 10. As shown in FIG. 9, a structural exploded diagram of a first rotating member 50 and an upper housing 31 in the control lever assembly 100 shown in FIG. 2 is shown. In this embodiment, the first limiting structure is a limiting block 3112 disposed on a bottom wall 311 of the upper housing 31. The limiting block 3112 is disposed on a surface that is of the bottom wall 311 and that faces an accommodating portion for accommodating the rotating member, and is disposed along a circumferential direction of the limiting hole 3111. In this embodiment, there are four limiting blocks 3112, the four limiting blocks 3112 being symmetrically disposed relative to a straight line passing through a center of the limiting hole 3111. In this embodiment, the limiting block 3112 is triangular. In other embodiments, the limiting block 3112 may be other suitable shapes such as a rectangle, circle and wedge-shape.

As shown in FIG. 9, when the first rotating member 50 is rotated around a Z axis (that is, an axis where the first rotating shaft 53 is located) to an extreme position, a rotating housing 52 abuts against the limiting block 3112. In particular, when the first rotating member 50 rotates clockwise around the Z axis, one angular position 521 of the two rotating housings 52 abuts against the two limiting blocks 3112 on a right side in the figure.

When the first rotating member 50 rotates counterclockwise around the Z axis, the other angular position 522 of the two rotating housings 52 abuts against the two limit blocks 3112 on a left side in the figure.

Figures 1, 10:
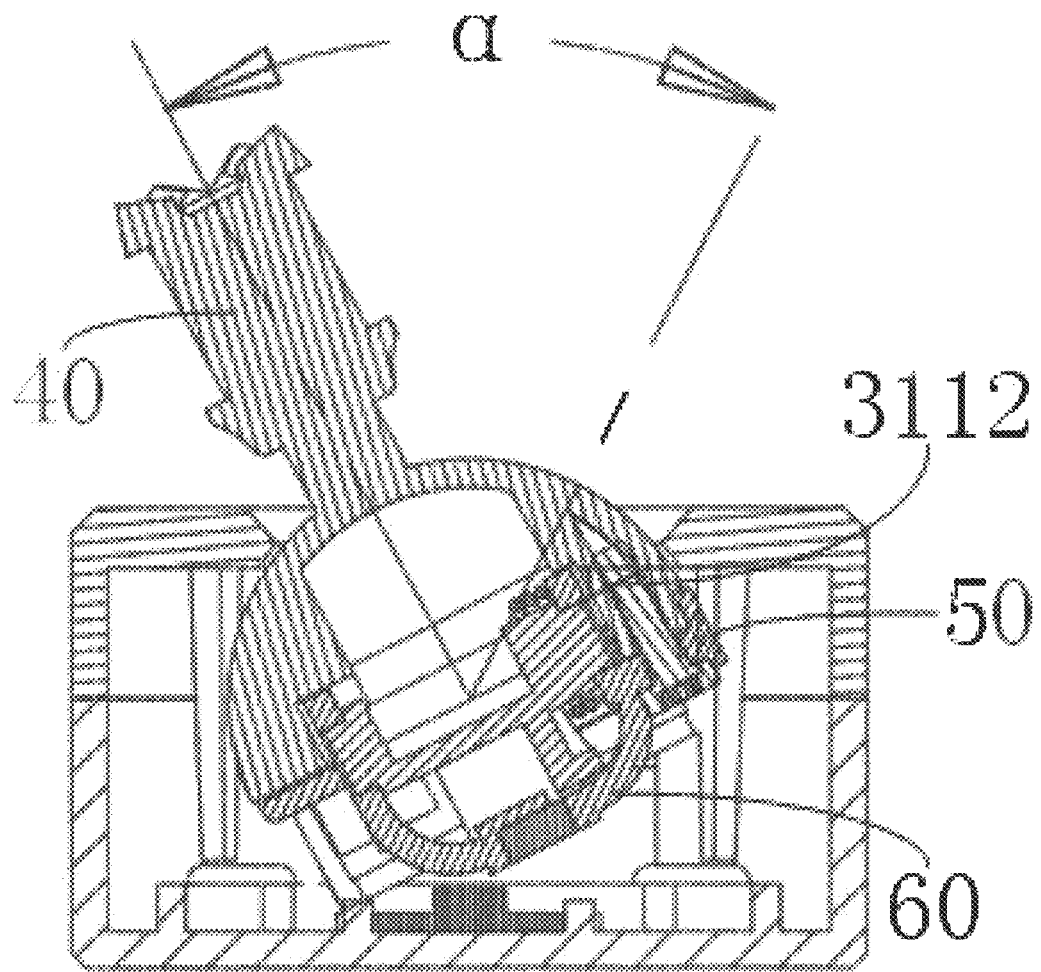
Figures 2, 10:
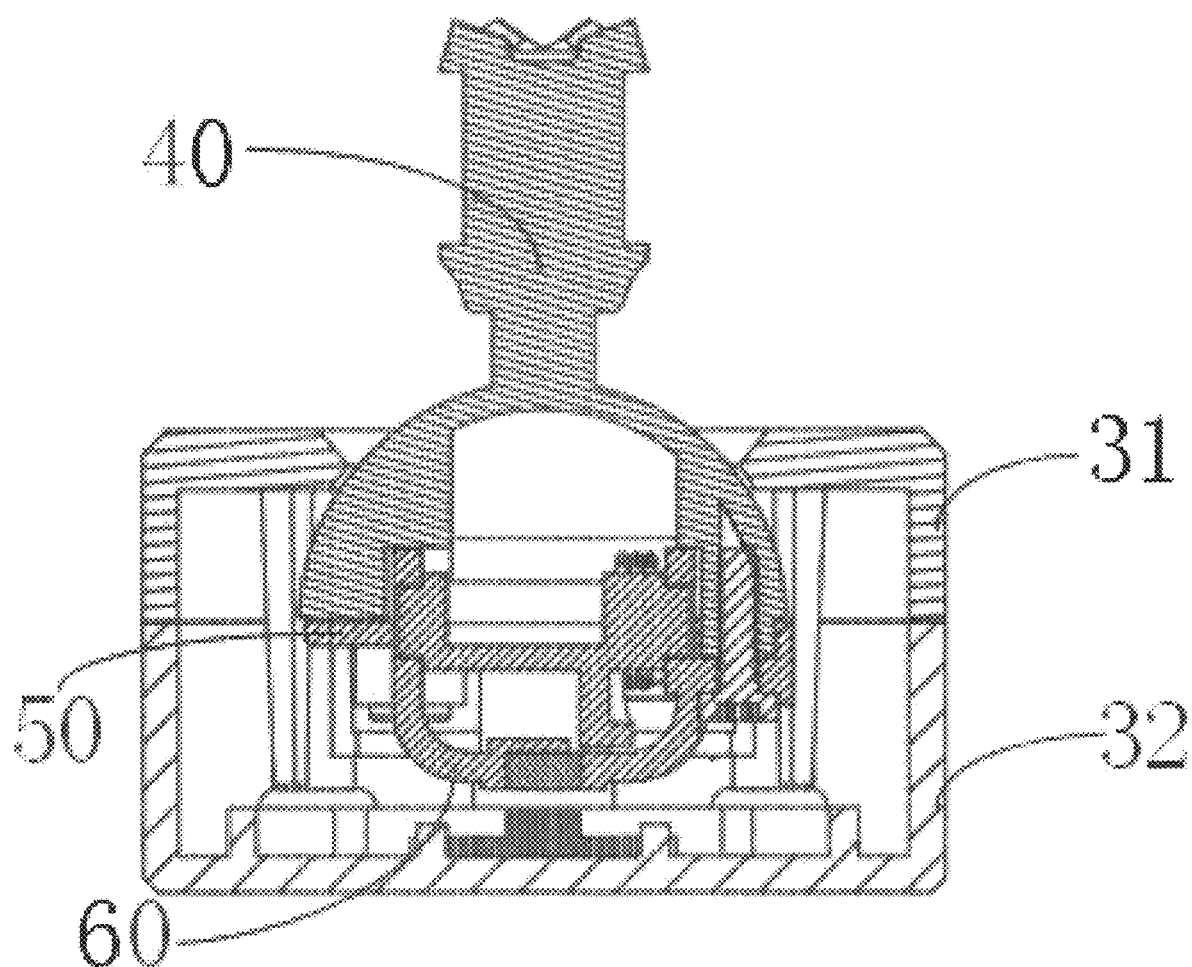
Figures 3, 10:
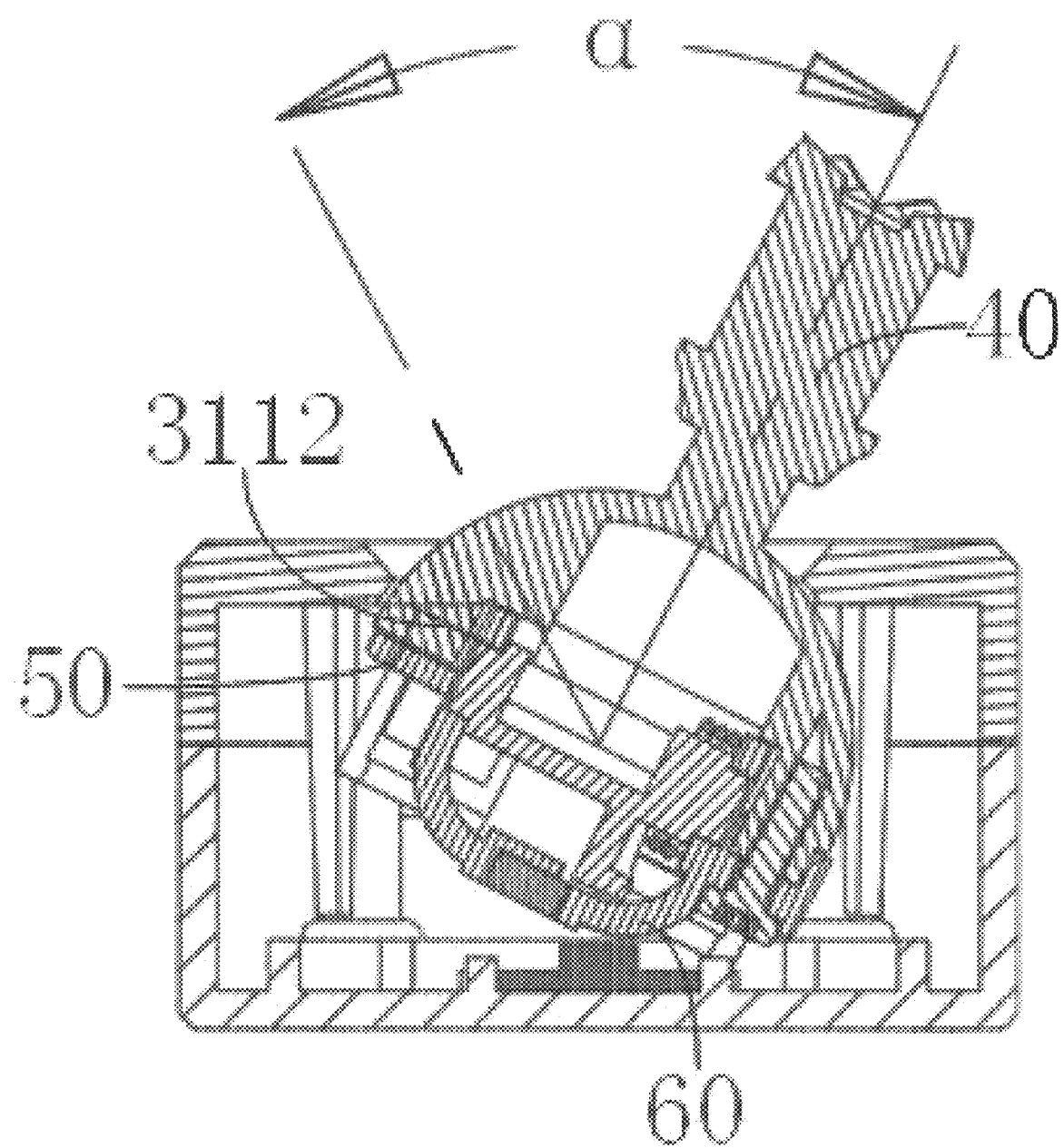

As shown in FIG. 10, FIG. 10 shows sectional diagrams of the control lever 40 and the first rotating member 50 at different positions during rotation around a first direction (a Z-axis direction) in the control lever assembly 100 shown in FIG. 2. When the control lever 40 drives the first rotating member 50 to rotate around the first direction relative to the housing 30, so that the first rotating member 50 swings to a position shown in FIG. 10-1 of FIG. 10, an angular position of one rotating housing 52 on the first rotating member 50 is blocked by two corresponding limiting blocks 3112 to prevent the control lever 40 from further rotating in the direction. Similarly, when the first rotating member 50 swings to a position shown in FIG. 10-3 of FIG. 10, an angular position of the other rotating housing 52 on the first rotating member 50 is blocked by the other two corresponding limiting blocks 3112 to prevent the control lever 40 from further rotating in the direction. A position shown in FIG. 10-2 of FIG. 10 is an initial position of the control lever 40. In a preferred embodiment, an angle α at which the control lever 40 rotates around the first direction is in a range of 45-60 degrees.

Figure 11:
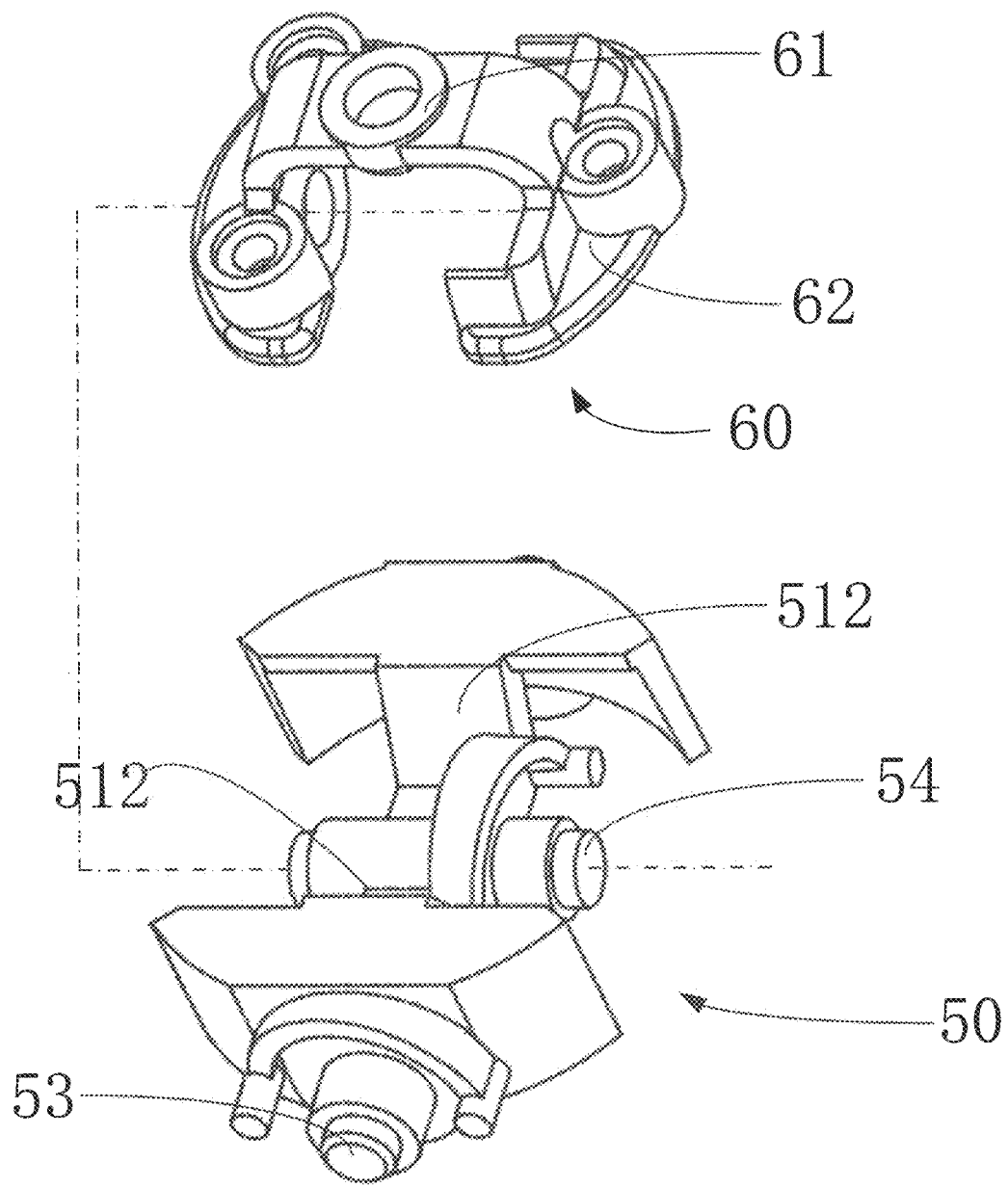
FIG. 11 is a structural exploded diagram of a first rotating member and a second rotating member in the control lever assembly shown in FIG. 2.

The second limiting structure of the control lever assembly 100 is specifically described below with reference to FIG. 11 and FIG. 12. FIG. 11 is a structural exploded diagram of a first rotating member 50 and a second rotating member 60 in the control lever assembly 100 shown in FIG. 2. In this embodiment, the second limiting structure includes a limiting portion 512 disposed on a rotating member body 51 of the first rotating member 50.

When the control lever 40 drives the second rotating member 60 to rotate to an extreme position, the base 61 of the second rotating member 60 abuts against the limiting portion 512. Preferably, the limiting portion 512 is an inclined face disposed on the rotating member body 51, the inclined face being symmetrically disposed on both sides of the second rotating shaft 54.

Figures 1, 12:
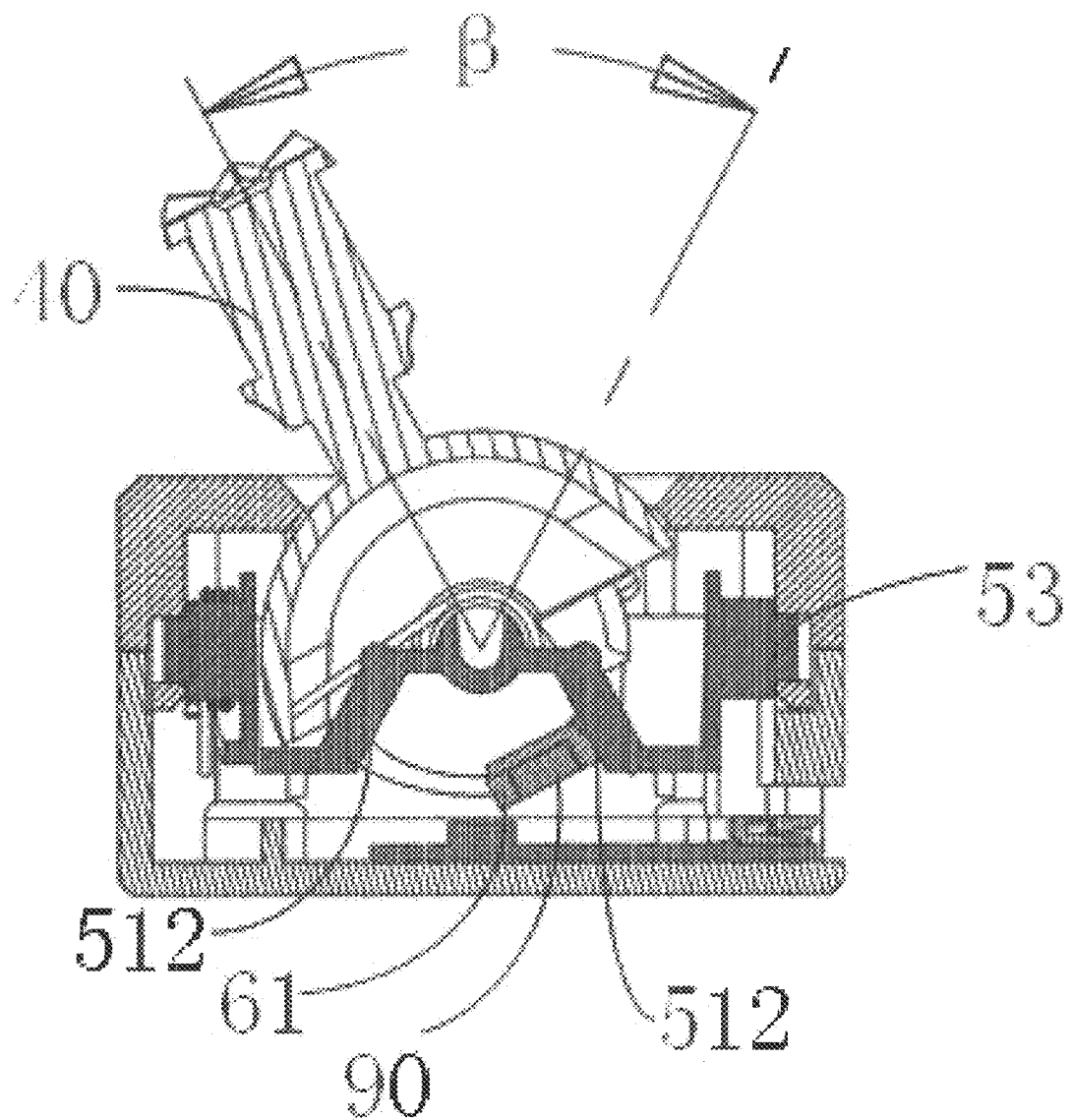
Figures 2, 12:
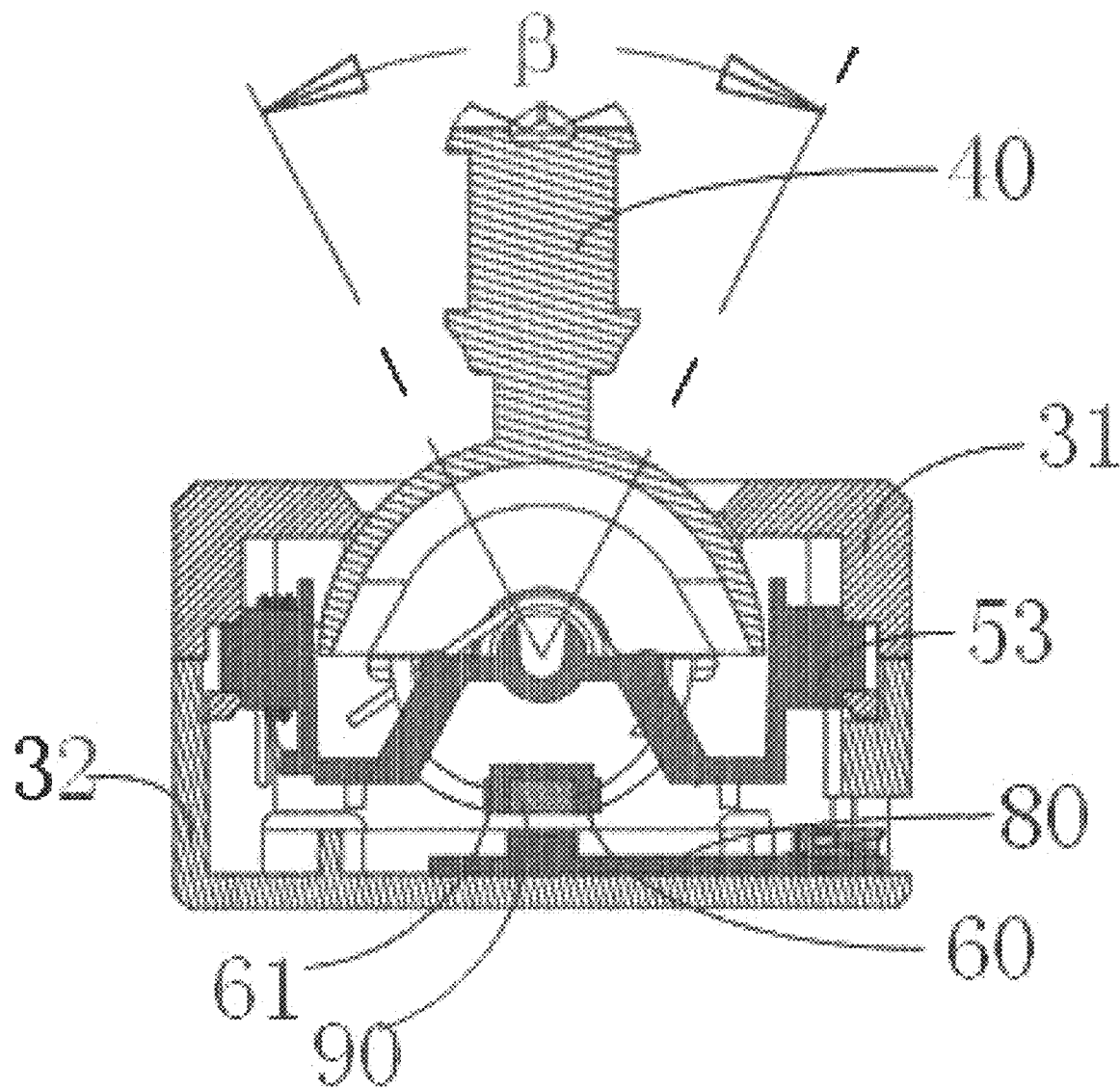
Figures 3, 12:
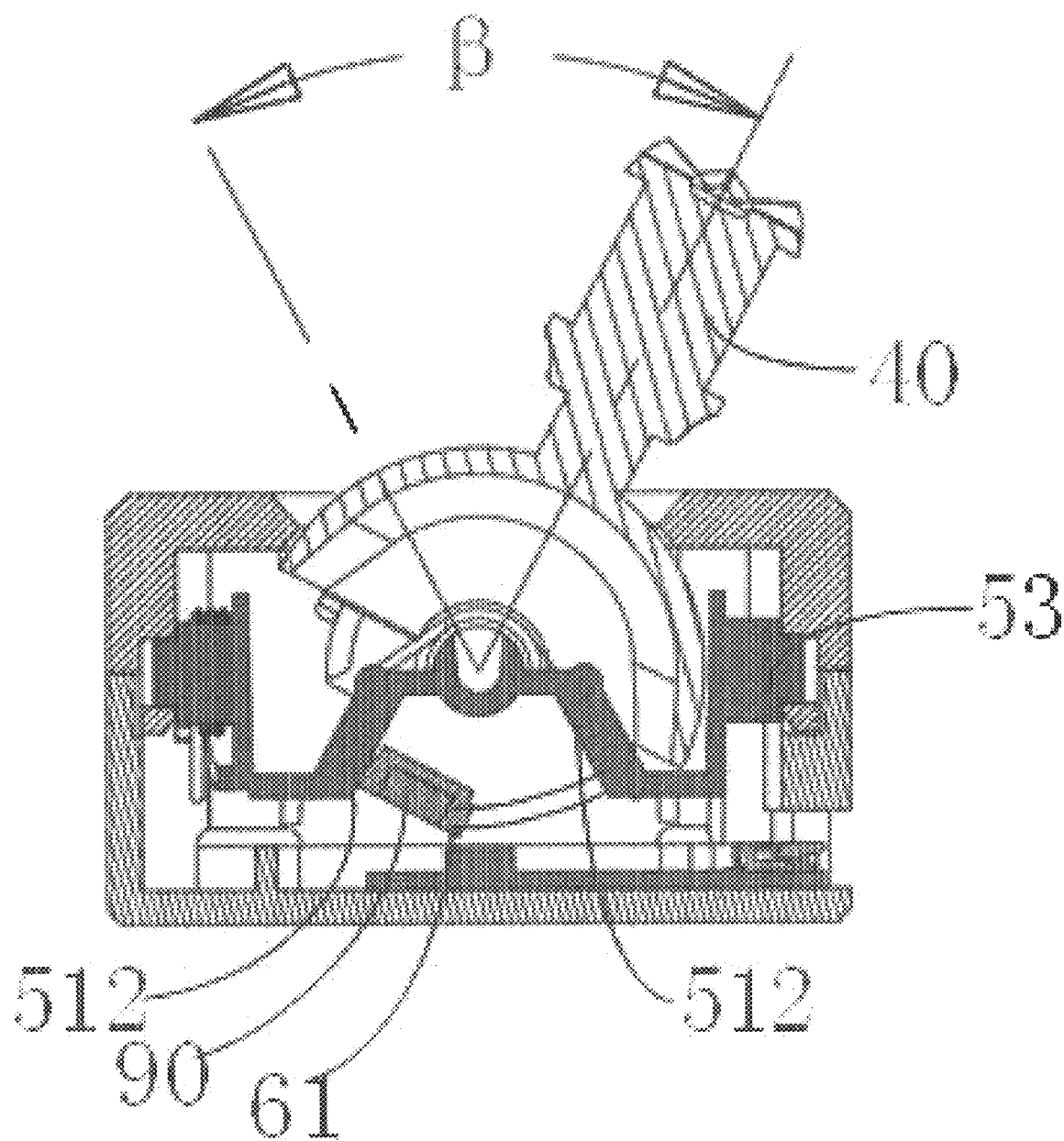

FIG. 12 shows sectional diagrams of the control lever 40 and the second rotating member 60 at different positions during rotation around a second direction (a direction where an X axis is located) in the control lever assembly 100 shown in FIG. 2. When the control lever 40 drives the second rotating member 60 to rotate around the second direction relative to the housing 30, so that the second rotating member 60 swings to positions shown in FIG. 12-1 and FIG. 12-3, the base 61 of the second rotating member 60 abuts against the limiting portion 512 of the first rotating member 50. In particular, when the control lever 40 drives the second rotating member 60 to swing to a position shown in FIG. 12-1 of FIG. 12, one side of the base 61 of the second rotating member 60 is blocked by one limiting face 512 of the first rotating member 50, to prevent the control lever 40 from further rotating in the direction. Similarly, when the control lever 40 drives the second rotating member 60 to swing to a position shown in FIG. 12-3 of FIG. 12, the other side of the base 61 of the second rotating member 60 is blocked by the other limiting face 512 of the first rotating member 50, to prevent the control lever 40 from further rotating in the direction. A position shown in FIG. 12-2 of FIG. 12 is an initial position of the control lever 40. In a preferred embodiment, an angle θ at which the control lever 40 rotates around a second direction is in a range of 45-60 degrees.

FIG. 13-1 and FIG. 13-2 show force bearing situations of a control lever 40 and a first rotating member 50 during rotation around a first direction (a z-axis direction) in the control lever assembly 100 shown in FIG. 2. As described above, the first elastic component 71 is sleeved on the first rotating shaft 53, two spring legs 711 and 712 thereof abutting against two first limiting posts 520 of the first rotating member 50 and two first limiting faces 310 of the upper housing 31, respectively. When the control lever 40 is rotated by an external force around the first direction, the first elastic component 71 provides an elastic restoring force for the control lever 40 to return to an intermediate position. In particular, as shown in FIG. 13-1, for example, when the control lever 40 is pushed by an external force F1 from a user to rotate around a first rotating shaft 53 counterclockwise as shown in a perspective of FIG. 13-1, a first limiting post 520 located on a left of the first rotating shaft 53 provides a pushing force F2 to push a spring leg 711 on a left of the first elastic component 71 to rotate counterclockwise around the first rotating shaft 53. In this case, because a spring leg 722 on a right of the first elastic component 71 is abutted by a first limiting face 310 on a right of the upper housing 31 in the figure and cannot be moved, the two spring legs 711 and 712 of the first elastic component 71 are close to each other, causing the first elastic component 71 to be compressed and elastically deformed, thereby generating an elastic restoring force F3. As shown in FIG. 13-2, when the user loosens a hand and no longer operates the control lever 40, the elastic restoring force F3 provided by the first elastic component 71 pushes the control lever 40 to rotate in an opposite direction, that is, pushing the control lever 40 to rotate clockwise around the first rotating shaft 53 so as to return to a natural state of an intermediate position. In addition, it should be understood that because two first limiting faces 310 are disposed on the upper housing 31, when the control lever 40 is rotated counterclockwise to an extreme position, the spring leg 712 of the first elastic component 71 touches the first limiting face 310 disposed on a right in FIG. 13-1 of the upper housing 31, so as to further limit rotation of the control lever 40 and provide hand feeling. When the user loosens the hand, the first elastic component 71 pushes the control lever 40 to return to the intermediate position toward an opposite direction, when the control lever rotates clockwise to an extreme position of the other side, the spring leg 711 of the first elastic component 71 touches the first limiting face 310 disposed on a left in FIG. 13-2 of the upper housing 31, and the control lever 40 stops rotating, helping to prevent the control lever 40 from continuing to rotate toward the opposite direction beyond the middle position and rotate to the other side, thereby forming a wrong operation of the control lever assembly 100, and further affecting a control of the remote control on a movable object.

Similarly, FIG. 14-1 and FIG. 14-2 show force bearing situations of a control lever 40 and a second rotating member 60 during rotation around a second direction (an X-axis direction) in the control lever assembly 100 shown in FIG. 2. As described above, the second elastic component 72 is sleeved on the second rotating shaft 54, two spring legs 721 and 722 thereof abutting against two second limiting posts 530 on the first rotating member 50 and two second limiting faces 630 of the second limiting member 60, respectively.

Figures 1, 15:
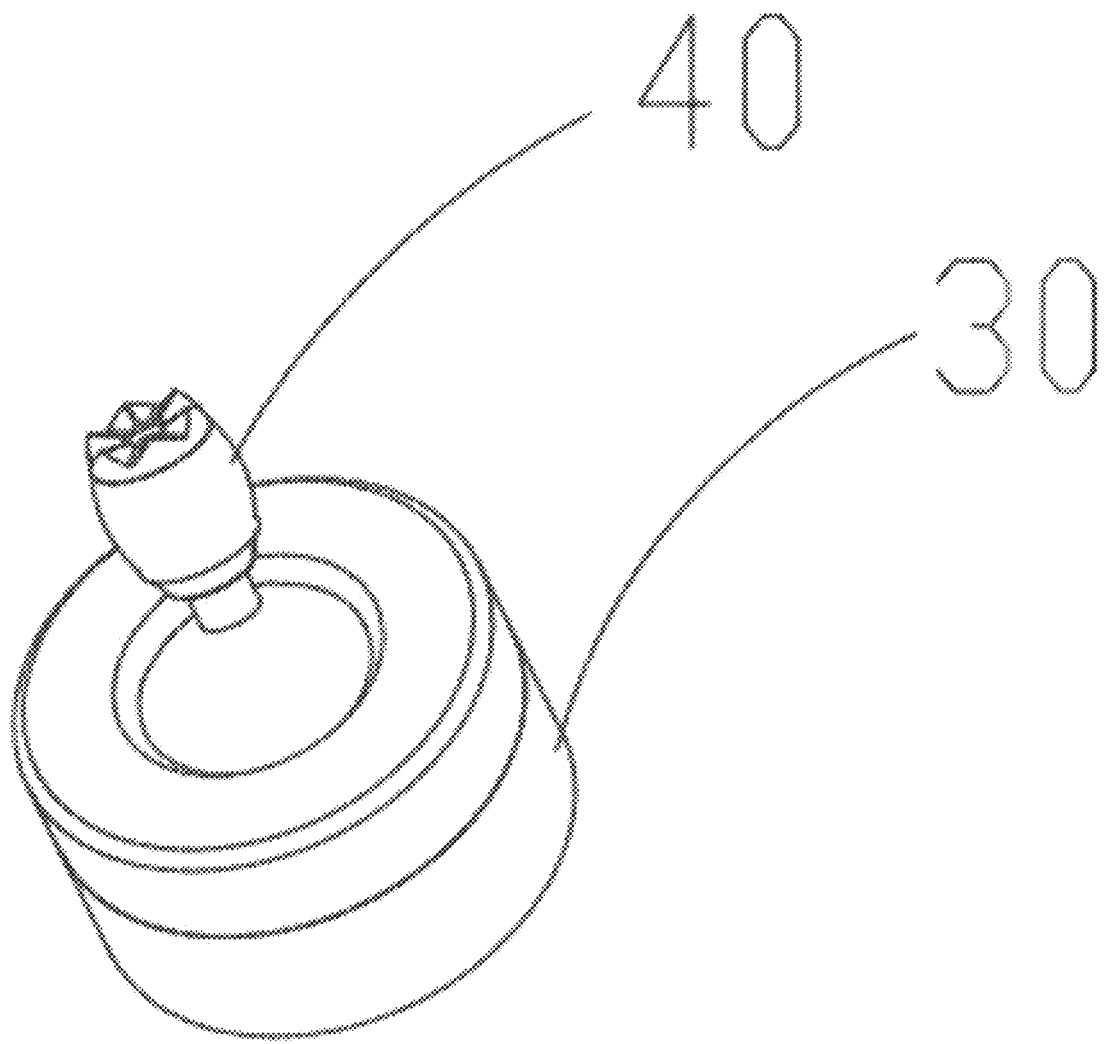
Figures 2, 15:
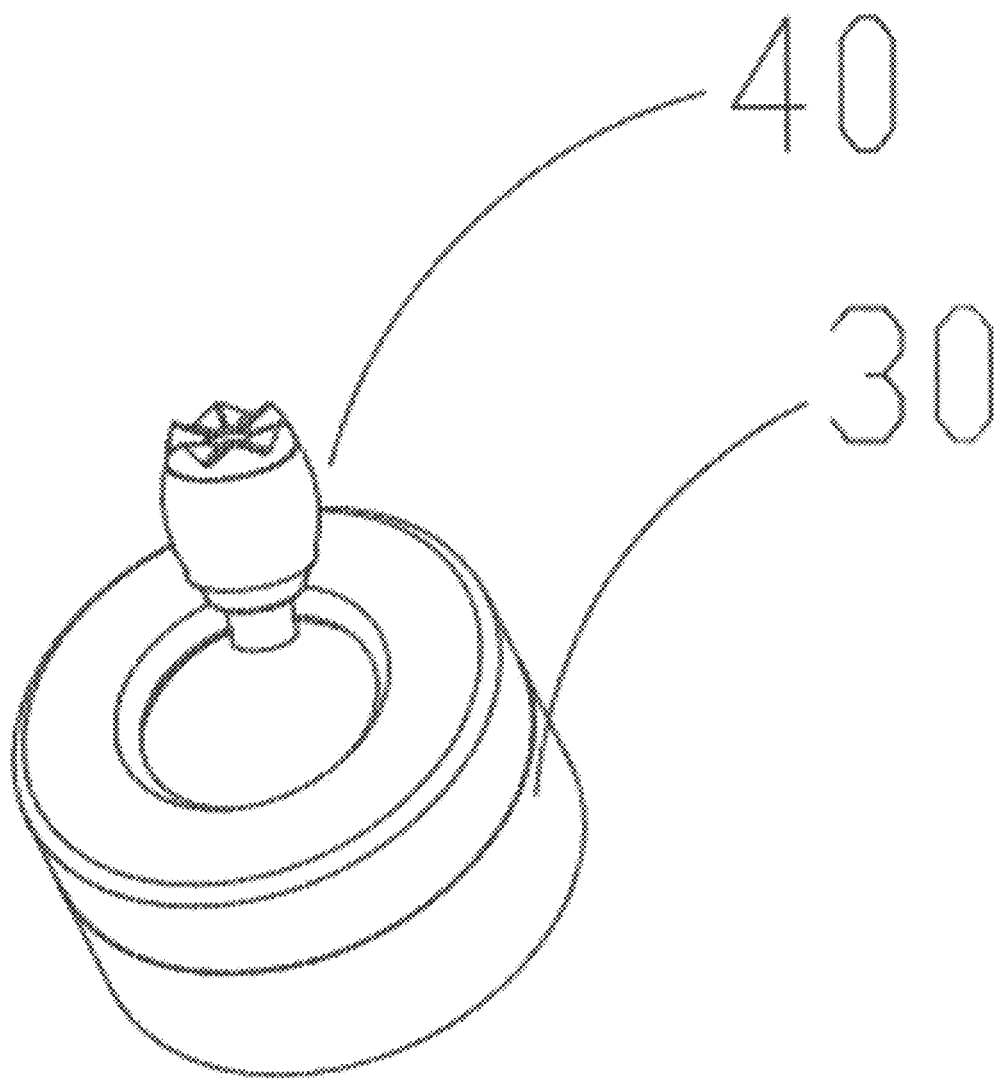
Figures 3, 15:
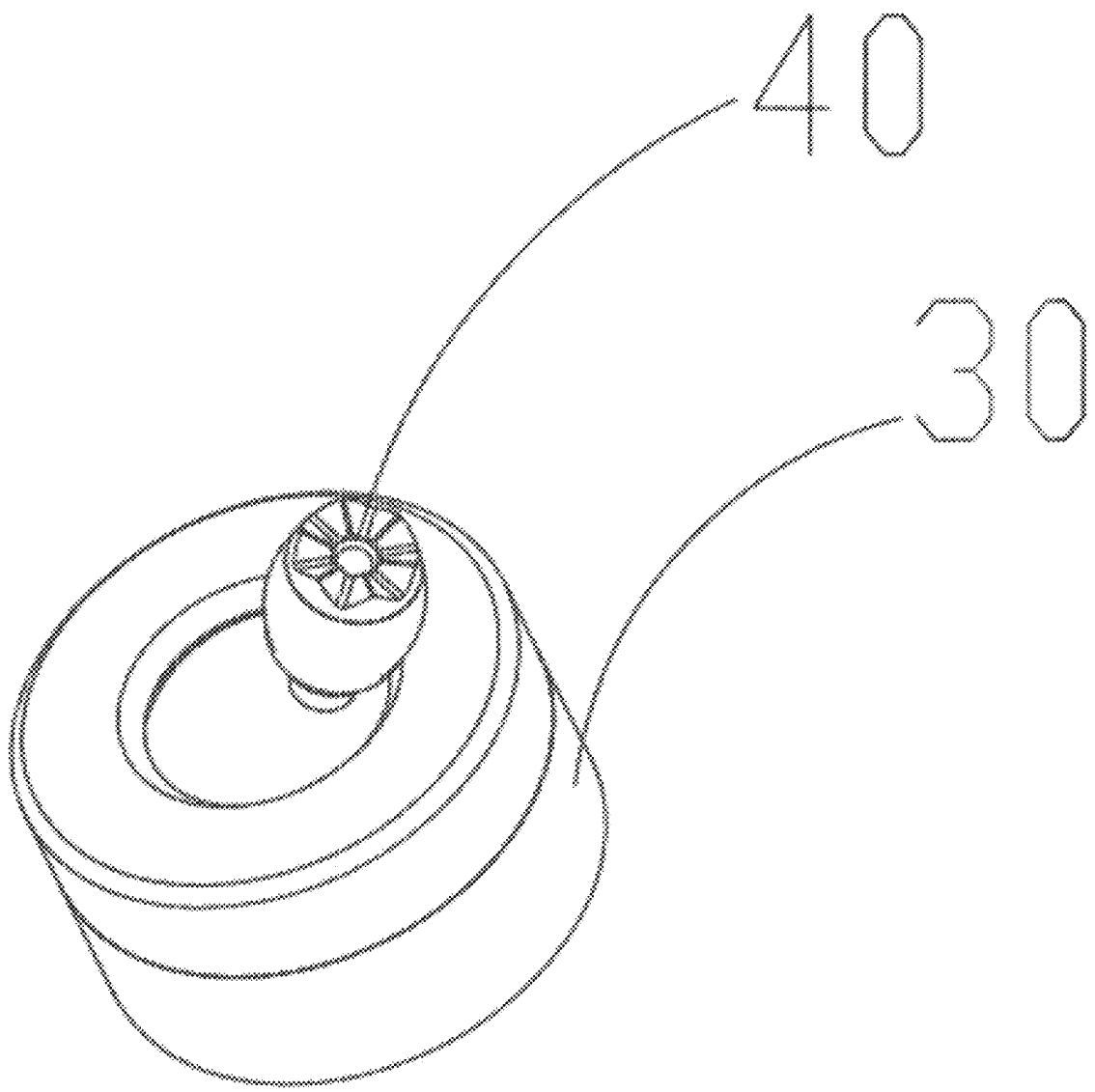
Figure 16:
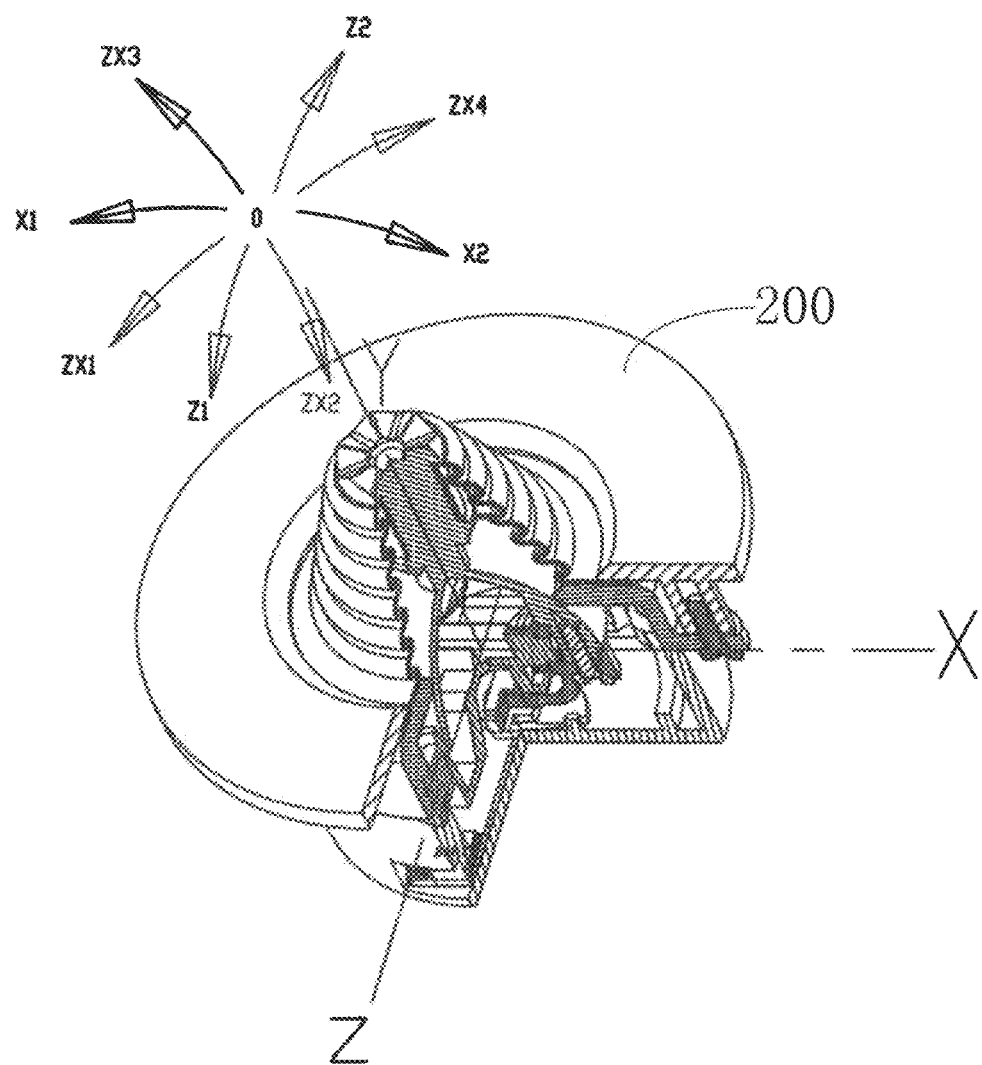
FIG. 16 is a partial sectional diagram of a control lever assembly according to another embodiment of the present invention.

When the control lever 40 is rotated by an external force around the second direction, the second elastic component 72 provides an elastic restoring force for the control lever 40 to return to an intermediate position. In particular, as shown in FIG. 14-1, for example, when the control lever 40 is pushed by an external force F4 from a user and rotates around a second rotating shaft 54 counterclockwise as shown in a perspective of FIG. 14-1, a second limiting post 530 on a left on the first rotating member 50 provides a force F5 to drive the spring leg 721 on a left of the second elastic component 72 to rotate counterclockwise around the second rotating shaft 54. After the spring leg 721 on the left of the second elastic component 72 is pushed by the force F5, because the spring leg 722 on a left of the second spring component 72 is abutted by a second limiting face 630 on a right on the second rotating member 60, the two spring legs 721 and 722 of the second elastic component 72 are close to each other, causing the second elastic component 72 to be compressed and elastically deformed, thereby generating an elastic restoring force F6. As shown in FIG. 14-2, when the user loosens a hand and no longer operates the control lever 40, the elastic restoring force F6 provided by the second elastic component 72 pushes the control lever 40 to rotate in an opposite direction, that is, pushing the control lever 40 to rotate clockwise around the second rotating shaft 54 so as to return to a natural state of an intermediate position. In addition, it should be understood that because two second limiting faces 630 are disposed on the second rotating member 60, when the control lever 40 is rotated counterclockwise to an extreme position, the spring leg 722 of the second elastic component 72 touches the second limiting face 630 on the right in FIG. 14-1 of the second rotating member 60, so as to further limit rotation of the control lever 40 and provide an elastic feeling. When the user loosens the hand, the second elastic component 72 pushes the control lever 40 to return to the intermediate position toward an opposite direction, when the control lever rotates clockwise to an extreme position of the other side, the spring leg 721 of the second elastic component 72 touches the second limiting face 630 disposed on a left in FIG. 14-2 of the second rotating member 60, and the control lever 40 stops rotating, helping to prevent the control lever 40 from continuing to rotate toward the opposite direction beyond the middle position and rotate to the other side, thereby forming a wrong operation of the control lever assembly 100, and further affecting a control of the remote control on a movable object. As shown in FIG. 15, when the user operates the control lever assembly 100, the control lever 40 swings in the housing 30 to cause the user to intuitively feel that the control lever 40 rotates around a center of a hemispheric dust-proof portion 41 relative to the housing 30 toward any direction, thereby providing better user experience.

Figure 17:
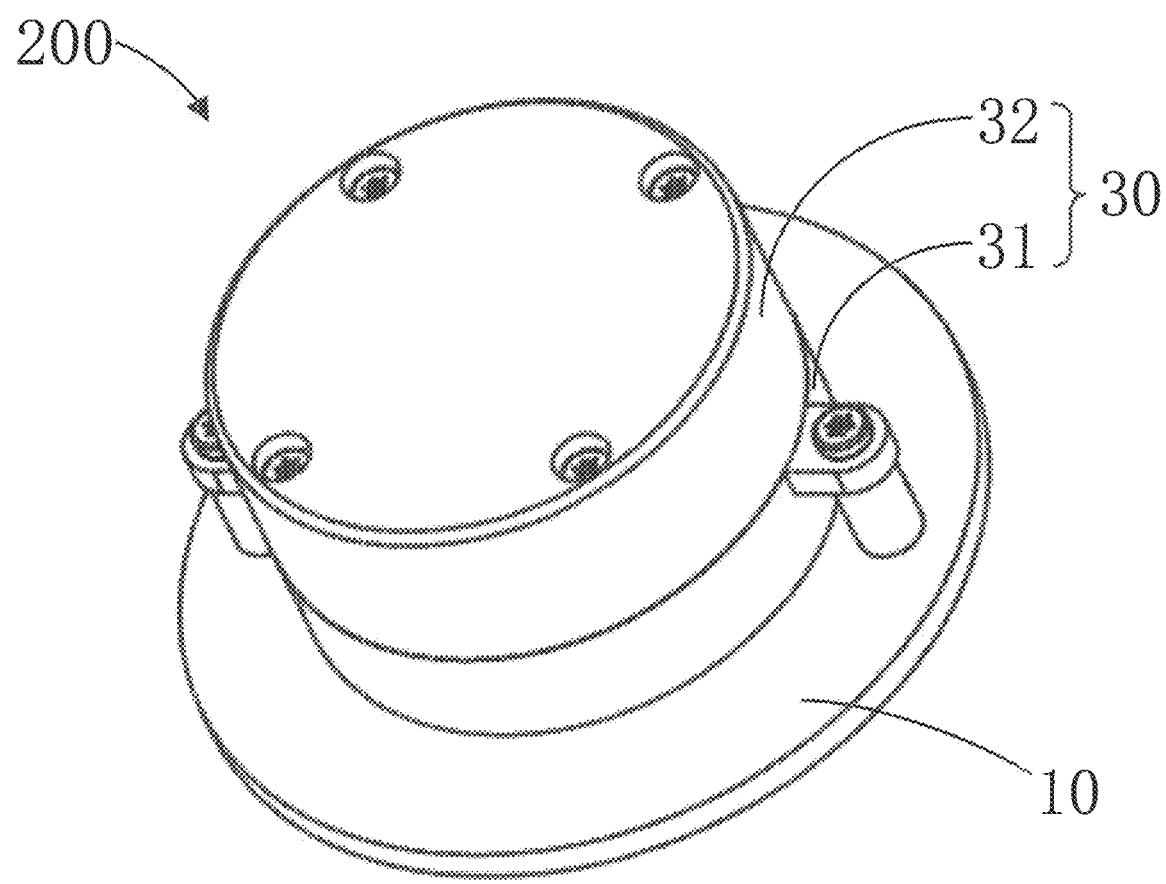
FIG. 17 is a three-dimensional structural diagram of the control lever assembly shown in FIG. 16 from another perspective.

FIG. 16 to FIG. 19 show a control lever assembly 200 of a remote control according to another embodiment of the present invention. In addition to all components of the control lever assembly 100 in a previous embodiment, the control lever assembly 200 in this embodiment further includes a cover plate 10 and a dust-proof cover 20. As shown in FIG. 17, the cover plate 10 is mounted to the housing 30. The dust-proof cover 20 is sleeved on the control lever 40 and is fixed to the housing 30 by the cover plate 10 so as to be connected to the housing 30. Because most of the structure of the control lever assembly 200 in this embodiment is the same as the structure of the control lever assembly 100 in the previous embodiment, details thereof are not described below, and the cover plate 10 and the dust-proof cover 20 of the control lever assembly 100 are mainly described below.

Figure 18:
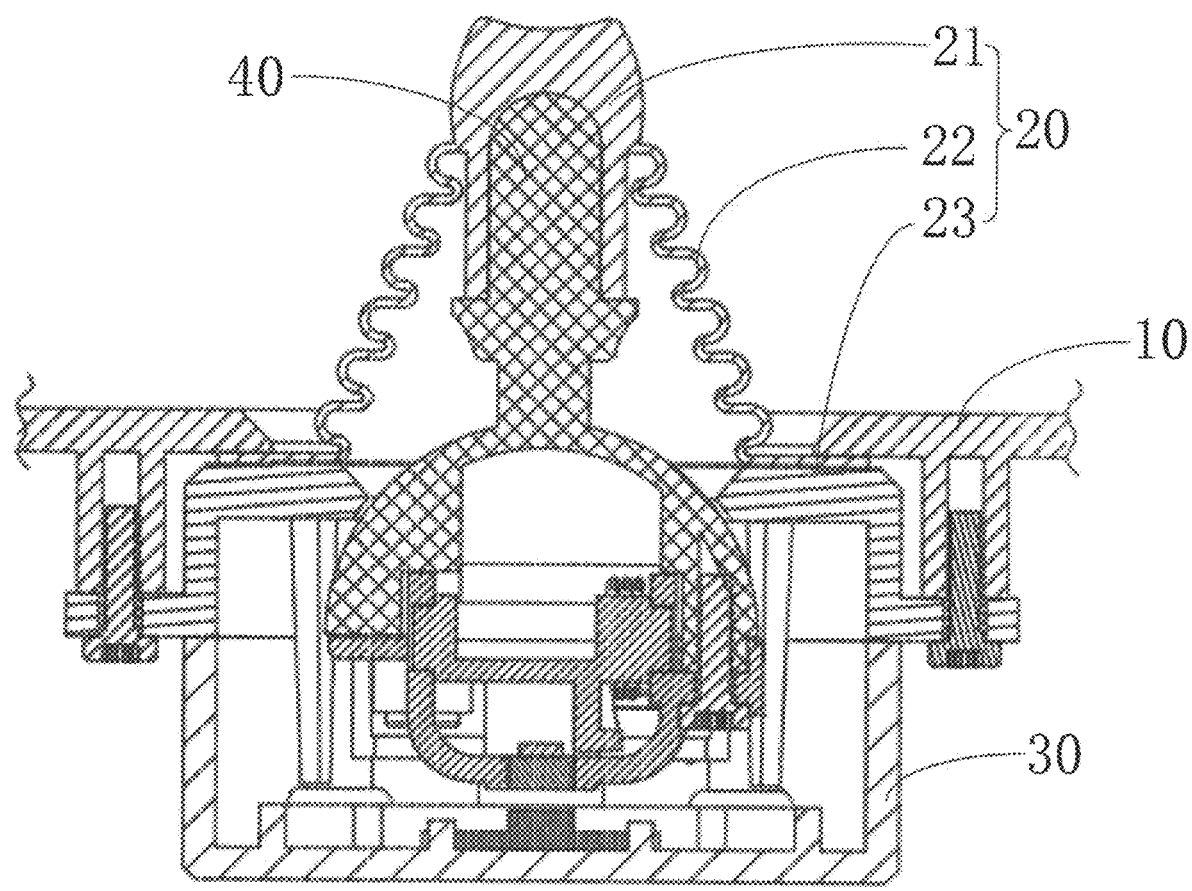
FIG. 18 is a sectional diagram of the control lever assembly shown in FIG. 16.

As shown in FIG. 18, the dust-proof cover 20 includes a fixing portion 21 sleeved on the control lever 40, an elastic bending portion 22 connected to the fixing portion 21 and a connecting portion 23 connected to the elastic bending portion 22. The fixing portion 21 is sleeved on a handle of the control lever 40, the elastic bending portion 22 extends from the fixing portion 21, and the connecting portion 23 is sandwiched between the cover plate 10 and the upper housing 31. In an embodiment of the present invention, the fixing portion 21, the elastic bending portion 22 and the connecting portion 23 may be integrally formed.

In the embodiment, the elastic bending portion 22 is a hollow cone or a hollow cylinder, the fixing portion 21 is disposed at one end of the elastic bending portion 22, and the connecting portion 23 is disposed at the other end of the elastic bending portion 22. The connecting portion 23 is in a sheet shape to facilitate fixed connection of the dust-proof cover 20 to the housing 30. The elastic bending portion 22 may be compressed or stretched along an axial direction thereof.

Figure 19:
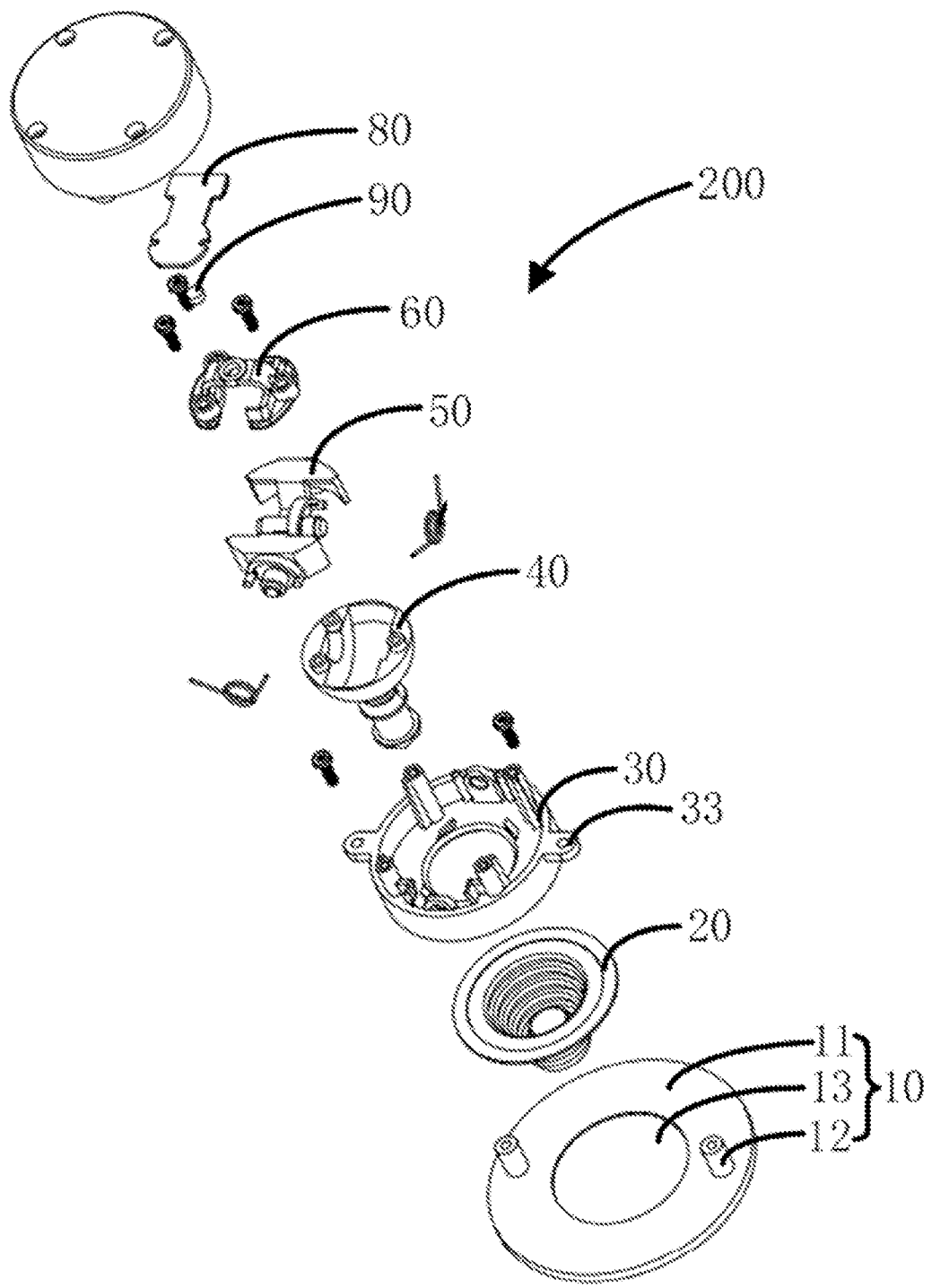
FIG. 19 is a structural exploded diagram of the control lever assembly shown in FIG. 16.

As shown in FIG. 19, the cover plate 10 includes a cover plate body 11 and a mounting post 12. An accommodating hole 13 for accommodating the control lever 40 is opened in a middle of the cover plate body 11. The cover plate body 11 has a ring-shaped thin plate shape, and the mounting post 12 is disposed on the cover plate body 11 and is provided with a screw hole (not shown). A mounting hole 33 corresponding to the mounting post 12 is disposed on the upper housing 31 of the housing 30, and the cover plate 10 is fixed to the upper housing 31 by screws passing through the mounting hole and matching with the screw holes.

A handle of the control lever 40 passes through the accommodating hole 13 and the limiting hole of the upper housing 31 in the housing 30, and the accommodating hole 13 is aligned with the limiting hole.

In this embodiment, there are two mounting posts 12 in total. It may be understood that, in some other embodiments, a number of the mounting posts 12 may also be set to three or more according to requirements of an actual situation.

In other possible embodiments, the cover plate 10 may also be omitted, and the dust-proof cover is directly fixed between the housing of the control lever assembly and the remote-control body.

A dust-proof cover 20 is disposed in the control lever assembly provided in the embodiment of the present invention to completely seal a gap between the housing 30 and the control lever 40, thereby preventing external sand, dust or moisture from entering the housing 30 through the gap between the housing 30 and the control levers 40.

Through the remote control provided according to the embodiments of the present invention, on the one hand, some external sand or moisture may be prevented from entering, on the other hand, an appearance of the control lever assembly may be better optimized, and the user who performs an operation may intuitively feel that the control lever rotates around the rotating center, providing better user experience.

It should be finally noted that the above embodiments are merely intended for describing the technical solutions of the present invention rather than limiting the present invention. Based on the idea of the present invention, the technical features in the foregoing embodiments or different embodiments may be combined, the steps may be implemented in any order, and many other changes in the different aspects of the present invention as described above may exist. For brevity, such changes are not provided in the detailed descriptions. Although the present invention is described in detail with reference to the foregoing embodiments, those of ordinary skill in the art should understand that they can still make modifications to the technical solutions described in the foregoing embodiments or make equivalent substitutions to some technical features thereof, without departing from scope of the technical solutions of the embodiments of the present invention.

What is claimed is:

1. A remote control (300), comprising:
a remote-control body (101); and
a control lever assembly (100) at least partially accommodated in the remote-control body (101),
the control lever assembly (100) comprising:
a housing (30) disposed in the remote-control body (101);
a rotating member disposed in the housing (30) and rotatably connected to the housing (30); and
a control lever (40) connected to the rotating member, the control lever (40) driving the rotating member to rotate around at least one direction relative to the housing (30); wherein
the control lever (40) has a handle (42) and a dust-proof portion (41) connected to the handle (42), the rotating member being connected to the dust-proof portion (41), the dust-proof portion (41) being partially accommodated in the housing (30), and the rotating member being shielded by the dust-proof portion (41); wherein the rotating member comprises a first rotating member (50) and a second rotating member (60); and
the first rotating member (50) comprises a rotating member body (51), a rotating housing (52) disposed at both ends of the rotating member body (51) and a first rotating shaft (53) disposed on the rotating housing (52) along a first direction and a second rotating shaft (54) disposed along a second direction, respectively;
the second rotating member (60) comprises a base (61) and an extending portion (62) disposed on both sides of the base (61), mounting holes (621) being disposed on two ends of the base (61), respectively, and the extending portion (62) being connected to the dust-proof portion (41); and
the first rotating member (50) is rotatably connected to the housing (30) through the first rotating shaft (53), two ends of the second rotating shaft (53) being accommodated in the mounting holes (621) respectively to cause the first rotating member (50) to be rotatably connected to the second rotating member (60).

2. The remote control (300) according to claim 1, wherein the dust-proof portion (41) has a hollow semi-spherical shape.

3. The remote control (300) according to claim 1, wherein the handle (42) and the dust-proof portion (41) are integrally formed.

4. The remote control (300) according to claim 1, wherein
the first rotating member (50) being rotatably connected to the housing (30) to cause the control lever (40) to drive the first rotating member (50) for rotating around the first direction relative to the housing (30); and
the second rotating member (60) being connected to the dust-proof portion (41) and being rotatably connected to the first rotating member (50), to cause the control lever (40) to drive the second rotating member (60) for rotating around the second direction relative to the housing (30).

5. The remote control (300) according to claim 1, wherein the first direction is perpendicular to the second direction.

6. The remote control (300) according to claim 1, wherein the control lever assembly (100) further comprises a first elastic component (71); the first elastic component (71) being sleeved on the first rotating shaft (53), and the first elastic component (71) abutting between the housing (30) and the first rotating member (50).

7. The remote control (300) according to claim 6, wherein the first elastic component (71) comprises a first sleeving portion sleeved on the first rotating shaft (53) and a first abutting portion extending from the first sleeving portion; and the first rotating member (50) further comprises first limiting posts (520) respectively disposed on both sides of the first rotating shaft (53), and first limiting faces (310) that are relatively spaced apart is disposed on the housing (30); a distance between the first limiting posts (520) being smaller than a distance between the first limiting faces (310); and the first abutting portion being sandwiched between the first limiting posts (520) and abutting against the first limiting posts (520) and the first limiting faces (310).

8. The remote control (300) according to claim 7, wherein the first elastic component (71) is a torsion spring, the first abutting portion being a spring leg of the torsion spring.

9. The remote control (300) according to claim 6, wherein the control lever assembly (100) further comprises a second elastic component (72); the second elastic component (72) being sleeved on the second rotating shaft (54), and the second elastic component (72) abutting between the second rotating member (60) and the first rotating member (50).

10. The remote control (300) according to claim 9, wherein the second elastic component (72) comprises a second sleeving portion sleeved on the second rotating shaft (54) and a second abutting portion extending from the second sleeving portion; and the first rotating member (50) further comprises second limiting posts (530) disposed on both sides of the second rotating shaft (54) respectively, and second limiting faces (630) that are relatively spaced apart are disposed on the second rotating member (60); a distance between the second limiting posts (530) being smaller than a distance between the second limiting faces (630); and the second abutting portion being sandwiched between the second limiting posts (530) and abutting the second limiting posts (530) and the second limiting faces (630).

11. The remote control (300) according to claim 10, wherein the second elastic component (72) is a torsion spring, the second abutting portion being spring legs (711, 712) of the torsion spring.

12. A remote control, comprising:
a remote-control body; and
a control lever assembly (200) at least partially accommodated in the remote-control body;
the control lever assembly (200) comprising:
a housing (30) disposed in the remote-control body;
a rotating member disposed in the housing (30) and rotatably connected to the housing (30);
a control lever (40) connected to the rotating member, the control lever (40) driving the rotating member to rotate around at least one direction relative to the housing (30); wherein
a dust-proof cover (20) sleeved on the control lever (40) and connected to the housing (30); and
wherein the control lever assembly (200) further comprises a cover plate (10), the cover plate (10) being provided with an accommodating hole (13) for accommodating the control lever (40), the cover plate (10) being connected to the housing (30), and a connecting portion (23) being sandwiched between the cover plate (10) and the housing (30).

13. The remote control according to claim 12, wherein the dust-proof cover (20) comprises a fixing portion (21) sleeved on the control lever (40), an elastic bending portion (22) connected to the fixing portion (21) and the connecting portion (23) connected to the elastic bending portion (22), the connecting portion (23) being connected to the housing (30).

14. The remote control according to claim 13, wherein the fixing portion (21), the elastic bending portion (22) and the connecting portion (23) are integrally formed.

15. The remote control according to any of claim 12, wherein the control lever (40) has a handle (42) and a dust-proof portion (41) connected to the handle (40), the rotating member being connected to the dust-proof portion (41), the dust-proof portion (41) being partially accommodated in the housing, and the rotating member being shielded by the dust-proof portion (41).

16. The remote control according to claim 15, wherein the dust-proof portion (41) has a hollow semi-spherical shape.

17. The remote control according to claim 15, wherein the handle (42) and the dust-proof portion (41) are integrally formed.

18. The remote control according to claim 12, wherein the rotating member:
a first rotating member (50), the first rotating member (50) being rotatably connected to the housing (30) to cause the control lever (40) to drive the first rotating member (50) for rotating around a first direction relative to the housing (30); and
a second rotating member (60), the second rotating member (60) being connected to the dust-proof portion (41) and being rotatably connected to the first rotating member (50), to cause the control lever (40) to drive the second rotating member (60) for rotating around a second direction relative to the housing (30).

19. The remote control according to claim 18, wherein the first rotating member (50) comprises a rotating member body (51), a rotating housing (52) disposed at both ends of the rotating member body (51) and a first rotating shaft (53) disposed on the rotating housing (52) along the first direction and a second rotating shaft (54) disposed along the second direction, respectively;
the second rotating member (60) comprises a base (61) and an extending portion (62) disposed on both sides of the base (61), mounting holes (621) being disposed on two ends of the base (61), respectively, and the extending portion (62) being connected to the dust-proof portion (41); and
the first rotating member (50) is rotatably connected to the housing (30) through the first rotating shaft (53), two ends of the second rotating shaft (53) being accommodated in the mounting holes (621) respectively to cause the first rotating member (50) to be rotatably connected to the second rotating member (60).

20. The remote control (300) according to claim 19, wherein the first direction is perpendicular to the second direction.

21. The remote control (300) according to claim 19, wherein the control lever assembly (100) further comprises a first elastic component (71); the first elastic component (71) being sleeved on the first rotating shaft (53), and the first elastic component (71) abutting between the housing (30) and the first rotating member (50).

22. The remote control (300) according to claim 21, wherein the first elastic component (71) comprises a first sleeving portion sleeved on the first rotating shaft (53) and a first abutting portion extending from the first sleeving portion; and the first rotating member (50) further comprises first limiting posts (520) respectively disposed on both sides of the first rotating shaft (53), and first limiting faces (310) that are relatively spaced apart is disposed on the housing (30); a distance between the first limiting posts (520) being smaller than a distance between the first limiting faces (310); and the first abutting portion being sandwiched between the first limiting posts (520) and abutting against the first limiting posts (520) and the first limiting faces (310).

23. The remote control (300) according to claim 22, wherein the first elastic component (71) is a torsion spring, the first abutting portion being a spring leg of the torsion spring.

24. The remote control (300) according to claim 21, wherein the control lever assembly (100) further comprises a second elastic component (72); the second elastic component (72) being sleeved on the second rotating shaft (54), and the second elastic component (72) abutting between the second rotating member (60) and the first rotating member (50).

25. The remote control (300) according to claim 24, wherein the second elastic component (72) comprises a second sleeving portion sleeved on the second rotating shaft (54) and a second abutting portion extending from the second sleeving portion; and the first rotating member (50) further comprises second limiting posts (530) disposed on both sides of the second rotating shaft (54) respectively, and second limiting faces (630) that are relatively spaced apart are disposed on the second rotating member (60); a distance between the second limiting posts (530) being smaller than a distance between the second limiting faces (630); and the second abutting portion being sandwiched between the second limiting posts (530) and abutting the second limiting posts (530) and the second limiting faces (630).

26. The remote control (300) according to claim 25, wherein the second elastic component (72) is a torsion spring, the second abutting portion being spring legs (711, 712) of the torsion spring.

\* \* \* \* \*